United States Patent
Tsuji et al.

(10) Patent No.: US 9,111,242 B2
(45) Date of Patent: Aug. 18, 2015

(54) EVENT DATA PROCESSING APPARATUS

(71) Applicant: Hitachi, Ltd., Chiyoda-ku, Tokyo (JP)

(72) Inventors: Satomi Tsuji, Koganei (JP); Nobuo Sato, Saitama (JP); Kazuo Yano, Hino (JP); Shinichi Fukuma, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 307 days.

(21) Appl. No.: 13/678,090

(22) Filed: Nov. 15, 2012

(65) Prior Publication Data

US 2013/0132480 A1  May 23, 2013

(30) Foreign Application Priority Data

Nov. 17, 2011 (JP) ................................ 2011-251221

(51) Int. Cl.
*G06F 15/16* (2006.01)
*G06Q 10/06* (2012.01)

(52) U.S. Cl.
CPC ..................................... *G06Q 10/06* (2013.01)

(58) Field of Classification Search
CPC ....... G06Q 10/06; G06Q 10/10; G06Q 50/01; G06Q 10/00; G06Q 10/0637; H04L 65/403; H04L 12/1827; H04N 7/15; H04N 7/155; H04W 4/08; G01C 22/006; G06K 9/00671; H04M 3/567
USPC .......................................................... 705/319
See application file for complete search history.

(56) References Cited

U.S. PATENT DOCUMENTS

| | | | |
|---|---|---|---|
| 8,068,986 B1* | 11/2011 | Shahbazi et al. | 702/14 |
| 2006/0246922 A1* | 11/2006 | Gasbarro et al. | 455/456.6 |
| 2008/0235367 A1* | 9/2008 | Niemeyer et al. | 709/224 |
| 2009/0177503 A1* | 7/2009 | Kawano et al. | 705/5 |
| 2009/0228318 A1 | 9/2009 | Ara et al. | |
| 2009/0271524 A1* | 10/2009 | Davi et al. | 709/231 |
| 2010/0191723 A1* | 7/2010 | Perez et al. | 707/723 |
| 2011/0054976 A1* | 3/2011 | Adler et al. | 705/9 |
| 2011/0150340 A1* | 6/2011 | Gotoh et al. | 382/190 |
| 2011/0196930 A1* | 8/2011 | Chawla et al. | 709/204 |
| 2011/0252097 A1* | 10/2011 | Walker et al. | 709/206 |
| 2011/0302169 A1* | 12/2011 | Brdiczka et al. | 707/740 |
| 2011/0313897 A1* | 12/2011 | Mulakaluri et al. | 705/30 |

FOREIGN PATENT DOCUMENTS

| | | | |
|---|---|---|---|
| JP | 8-274888 | A | 10/1996 |
| JP | 2007-27918 | A | 2/2007 |
| JP | 2009-64275 | A | 3/2009 |
| JP | 2009-211574 | A | 9/2009 |
| JP | 4525318 | B2 | 8/2010 |

* cited by examiner

*Primary Examiner* — Brian J Gillis
*Assistant Examiner* — Kamran Mohammadi
(74) *Attorney, Agent, or Firm* — Crowell & Moring LLP

(57) ABSTRACT

An event data processing apparatus calculates a meeting person number difference which is a difference in the number of meeting persons between a first number of meeting persons at a first time and a second number of meeting persons at a second time, determines that a continuous communication is conducted between the first time and the second time if the meeting person number difference is equal to or smaller than a meeting person number threshold value which is a predetermined threshold value, and records persons included in the first number of meeting persons and the second number of meeting persons, the first time, and the second time in association with event identifiers for identifying events in a recording module.

16 Claims, 32 Drawing Sheets

FIG. 7

TITLE AREA (ODST) — DATE SWITCHING AREA (ODSD) — DISPLAY (OD) — EVENT DISPLAY FIELD (ODEI)

EVENT INDEX CHANGE RECIPE GROUP CONTROL OUTPUT FOR MANAGER   MS. KANAE TAKAHASHI  LOG OUT

SEARCH

2011/9/30 (Fri)
<< < UPDATE > >>

EVENT FIELD

MS. KANAE TAKAHASHI AND MR. KIYOHIKO HAVE LEAVED AT 20:00 TO 20:30
2011/9/30 20:00

MS. AYUMI YAMASHITA HAS LEAVED AT 19:30 TO 20:00
2011/9/30 19:30

MS. KANAE TAKAHASHI
A-COMPANY CASE  MATERIAL WRITTEN  SEP. 30 Fri 17:30-19:20 (100 MINUTES)
17:30-18:00
18:05-19:05
19:10-19:20
2011/9/30 17:30

A-COMPANY CASE  PROGRAM REPORT CONFERENCE  SEP. 30 Fri 16:05-17:05
(60 MINUTES)
MASAKI SAKAI
AYUMI YAMASHITA
KANAE TAKAHASHI
YOSHIYUKI ITOU
AYUMI YAMASHITA
KANAE TAKAHASHI
2011/9/30 16:05

MS. AYUMI YAMASHITA
(GROUP NAME) (BUSINESS) SEP. 30 Fri 13:12-15:48 (156 MINUTES)
13:12-14:52
15:05-15:48
2011/9/30 13:12

MS AYUMI YAMASHITA HAS LEAVED AT 13:00 TO 13:30
2011/9/30 13:00

MR. KIYOHIKO MATSUMOTO
(GROUP NAME) (BUSINESS) SEP. 30 Fri 11:25-14:45 (20 MINUTES)

EVENT
TYPE
☑ MEETING (WITH CONFERENCE)
☑ INDIVIDUAL WORK
☑ ARRIVE
☑ LEAVE
☑ EXECUTION OF RECIPE

GROUP
REFINING METHOD
● REFINE MEMBERS
○ REFINE GROUPS

TYPE
GROUP OWNED BY YOU
  NO
GROUP YOU ENTER AS MEMBER
☑ A-COMPANY CASE
☐ NEXT-YEAR NEW PROPOSAL PROJECT
GROUP YOU ENTER AS SUPERVISOR
☐ AUTUMN EXHIBITION ARRANGEMENT

DISPLAY SWITCHING AREA (ODSI)

FIG. 10

USER ID CORRESPONDENCE TABLE (ASUL)

| USER NO. (ASUIT1) | USER NAME (ASUIT2) | TERMINAL ID (ASUIT3) | DEPARTMENT (ASUIT4) | SECTION (ASUIT5) |
|---|---|---|---|---|
| 0 | AYUMI YAMASHITA | 1000 | A DEPARTMENT | - |
| 1 | KANAE TAKAHASHI | 1001 | A DEPARTMENT | A1 SECTION |
| 2 | MASAKI SAKAI | 1002 | A DEPARTMENT | A1 SECTION |
| 3 | YOSHIYUKI ITOU | 1003 | A DEPARTMENT | A2 SECTION |
| 4 | YASUNORI FUJIWARA | 1004 | A DEPARTMENT | A2 SECTION |
| 5 | HARUKA MORI | 1005 | B DEPARTMENT | - |
| 6 | MASARU HARADA | 1006 | B DEPARTMENT | - |
| 7 | MITSUO TAKEUCHI | 1007 | C DEPARTMENT | C1 SECTION |
| 8 | MISA HASEGAWA | 1008 | C DEPARTMENT | C1 SECTION |

FIG. 11

GROUP CONTROL LIST (ASGR)

| GROUP NO. | START DATE | END DATE | GROUP NAME | MEMBER LIST (ID, CORRESPONDENCE) |
|---|---|---|---|---|
| G01 | 20110401 | 20120331 | A-COMPANY CASE | 1000 (OWNERS), 1001 (MEMBERS), 1002 (MEMBERS), 1006 (SUPERVISORS) |
| G02 | 20110901 | 20111220 | NEXT-YEAR NEW PROPOSAL PROJECT | 1000 (SUPERVISORS), 1002 (MEMBERS), 1015 (OWNERS) |
| G03 | 20110801 | 20110930 | AUTUMN EXHIBITION ARRANGEMENT | 1002 (SUPERVISORS), 1003 (MEMBERS), 1007 (MEMBERS), 1008 (OWNERS) |
| G04 | 20110401 | 20120331 | B-COMPANY CASE | 1010 (OWNERS), 1011 (MEMBERS), 1012 (MEMBERS), 1006 (SUPERVISORS) |
| G05 | 20110701 | 20110731 | C DEVELOPMENT TEST | 1006 (SUPERVISORS), 1012 (MEMBERS), 1018 (OWNERS) |

FIG. 12

ACCELERATION DATA TABLE
(SSDB_ACC_1002)

| | TIME (DBTM) | ACCELERATION x (DBAX) | ACCELERATION y (DBAY) | ACCELERATION z (DBAZ) |
|---|---|---|---|---|
| RE01 | 20070224-13:37:45.00 | 0.10379 | 0.85863 | -0.16040 |
| RE02 | 20070224-13:37:45.02 | 0.21701 | 1.04734 | -0.65105 |
| RE03 | 20070224-13:37:47.04 | -0.00944 | 1.00959 | -0.04718 |
| RE04 | 20070224-13:37:47.06 | -0.00944 | 1.00959 | -0.04718 |

FIG. 13A

MEETING TABLE (SSDB_IR_1002)

| | TIME (DBTM) | INFRARED RAY TRANSMITTING SIDE ID1 (DBR1) | NUMBER OF RECEIVING TIMES 1 (DBN1) | ... | INFRARED RAY TRANSMITTING SIDE ID10 (DBR10) | NUMBER OF TIMES OF RECEIVING 10 (DBN10) |
|---|---|---|---|---|---|---|
| RE01 | 20070219-13:37:40.00 | 1000 | 3 | ... | null | null |
| RE02 | 20070219-13:37:50.00 | null | null | ... | null | null |
| RE03 | 20070219-13:38:00.00 | null | null | ... | null | null |
| RE04 | 20070219-13:38:10.00 | 1003 | 1 | ... | null | null |
| RE05 | 20070219-13:38:20.00 | 1003 | 3 | ... | null | null |
| RE06 | 20070219-13:38:30.00 | 1003 | 6 | ... | null | null |

FIG. 13B

MEETING TABLE (SSDB_IR_1003)

| | TIME (DBTM) | INFRARED RAY TRANSMITTING SIDE ID1 (DBR1) | NUMBER OF RECEIVING TIMES 1 (DBN1) | ... | INFRARED RAY TRANSMITTING SIDE ID10 (DBR10) | NUMBER OF TIMES OF RECEIVING 10 (DBN10) |
|---|---|---|---|---|---|---|
| RE01 | 20070219-13:37:40.00 | null | null | ... | null | null |
| RE02 | 20070219-13:38:10.00 | null | null | ... | null | null |
| RE03 | 20070219-13:38:20.00 | 1002 | 2 | ... | null | null |
| RE04 | 20070219-13:38:30.00 | 1002 | 4 | ... | null | null |

FIG. 14

MEETING EVENT TABLE (ASCE)

| EVENT ID | START TIME | END TIME | MEMBER ID | PARTICIPATION TIME | ACTIVE TIME | LISTENING TIME |
|---|---|---|---|---|---|---|
| #20110930_C025 | 20110930-11:03:00 | 20110930-11:13:00 | 1000 | 11 | 6 | 5 |
| | | | 1001 | 9 | 7 | 0 |
| | | | 1002 | 11 | 5 | 0 |
| #20110930_C026 | 20110930-11:13:00 | 20110930-11:18:00 | 1000 | 6 | 6 | 0 |
| | | | 1002 | 6 | 3 | 0 |
| #20110930_C027 | 20110930-16:05:00 | 20110930-17:05:00 | 1002 | 60 | 40 | 12 |
| | | | 1000 | 55 | 35 | 0 |
| | | | 1001 | 60 | 25 | 10 |
| | | | 1003 | 15 | 5 | 0 |

FIG. 15

INDIVIDUAL WORK EVENT TABLE (ASPE)

| EVENT ID | MEMBER ID | LOW EVENT ID | START TIME | END TIME | MAXIMUM CONVERGENCE DURATION TIME | CONVERGENCE (HIGH) | CONVERGENCE (LOW) | STAGNATION |
|---|---|---|---|---|---|---|---|---|
| #20110930_P010 | 1001 | #20110930_P010-1 | 20110930-17:30:00 | 20110930-18:00:00 | 20 | 11 | 12 | 7 |
|  |  | #20110930_P010-2 | 20110930-18:05:00 | 20110930-19:05:00 | 25 | 20 | 25 | 15 |
|  |  | #20110930_P010-3 | 20110930-19:10:00 | 20110930-19:20:00 | 3 | 5 | 2 | 3 |
| #20110930_P011 | 1012 | #20110930_P011-1 | 20110930-18:00:00 | 20110930-18:20:00 | 7 | 5 | 15 | 0 |
|  |  | #20110930_P011-2 | 20110930-18:25:00 | 20110930-18:55:00 | 12 | 5 | 10 | 15 |
| #20110930_P012 | 1008 | #20110930_P012-1 | 20110930-18:10:00 | 20110930-19:30:00 | 15 | 40 | 30 | 10 |
|  |  | #20110930_P012-2 | 20110930-19:50:00 | 20110930-20:50:00 | 20 | 30 | 20 | 10 |

FIG. 16

SUBJECTIVE INFORMATION TABLE (ASST)

| EVENT ID | GROUP CLASSIFI-CATION | WORK CLASSIFI-CATION | (CONFIDENTIAL) DESIGNATION | "Good!" NUMBER | COMMENTS | FILE | ADVANCING/ADVANCED ||
|---|---|---|---|---|---|---|---|---|
| | | | | | | | MEMBER ID | DESCRIPTION |
| #20110930_C027 | G01 | PROGRESS REPORT CONFERENCE | No | 3 | null | "20110930 A-COMPANY EVALUATION DATA.xls" | 1000 | 4. PROGRESS REPORT, NEXT-WEEK CLIENT MEETING POLICY DISCUSSION. I CONFIRMED PROGRESS OF MEMBERS. I REQUESTED PERSON PRIMARILY RESPONSIBLE FOR MATERIAL PROVISION FROM MS. TAKAHASHI. |
| | | | | | | | 1001 | 3. PROGRESS REPORT, NEXT-WEEK CLIENT MEETING POLICY DISCUSSION. TO PERSON PRIMARILY RESPONSIBLE FOR MATERIAL PROVISION, WE MADE A DETERMINATION TO AGGREGATE EVALUATION DATA OF MR. SAKAI AND MR. ITOH. I WILL OBTAIN EVALUATION DATA AND START MATERIAL PROVISION. I WILL BE CAREFUL NOT TO BE DIVERGENT BETWEEN PREVIOUS MATERIAL AND DATA. |
| #20110930_C028 | G08 | DEPARTMENT MANAGER CONFERENCE | Yes | 0 | null | "20110930 DEPARTMENT MANAGER CONFERENCE.doc" | null | null |
| #20110930_P010 | G01 | MATERIAL PROVISION | No | 0 | MASAKI SAKAI: THANK YOU FOR YOUR HARD WORK. I THINK THAT GRAPHING IS VERY GOOD, AND THE MATERIAL BECOMES EASY TO UNDERSTAND. | null | 1025 | 4. DATA REDUCTION FOR MAKING NEXT-WEEK MEETING WITH CLIENT, REPORT MATERIAL PROVISION. EASY-TO-UNDERSTAND MATERIAL WAS PROVIDED WITH ADDITION OF COMPARISON WITH OTHER COMPANIES TO SAY ADVANTAGES OF PROPOSAL. I WILL SUBMIT MATERIAL TO SECTION CHIEF YAMASHITA, AND CORRECT THE MATERIAL BASED ON HIS OPINION. |

FIG. 17

DATA PROCESSING VARIABLE SCREEN (ODDV)

| INDEX EVENT | CHANGE RECIPE | GROUP CONTROL | FOR OUTPUT MANAGER | MR. IT IN CHARGE LOG OUT |

DATA PROCESSING VARIABLE SETTING SCREEN

| ITEM | PRESENT SET |
|---|---|
| ■ EVENT | --- |
| ○ MEETING EVENT | --- |
| • ELEMENT EVENT EXTRACTION, MEMBER MATCH RATE THRESHOLD VALUE (th_m1) | 50% OR HIGHER |
| • ELEMENT EVENT EXTRACTION, LISTENING TIME DETERMINATION THRESHOLD VALUE (th_m2) | 5 MINUTES OR LONGER |
| • ELEMENT EVENT EXTRACTION, WINDOW TIME WIDTH (n) | 4 MINUTES |
| • ELEMENT EVENT ASSOCIATE, MEMBER MATCH RATE THRESHOLD VALUE (th_c1) | 65% OR HIGHER |
| • ELEMENT EVENT ASSOCIATE, TIME OVERLAP RATIO THRESHOLD VALUE (th_c2) | 20% OR HIGHER |
| • EVENT DISPLAY TIME THRESHOLD VALUE (th_d) | 5 MINUTES OR LONGER |
| ○ INDIVIDUAL WORK EVENT | --- |
| • BATCH EVENTS FOR EACH OF MORNING, AFTERNOON, AND NIGHT, AND DISPLAY THOSE EVENTS AS ONE EVENT | YES |
| • MEETING DETERMINATION DATA, SUPPLEMENT COEFFICIENT (th_p1) | 4 MINUTES |
| • ACTIVITY DETERMINATION DATA, SUPPLEMENT COEFFICIENT (th_p2) | 1 MINUTE |
| • INDIVIDUAL WORK DETERMINATION DATA, SUPPLEMENT COEFFICIENT (th_p3) | 2 MINUTES |
| • ACTIVITY DETERMINATION, THRESHOLD VALUE (ACCELERATION RHYTHM) (th_per) | 2.0 Hz OR HIGHER |
| • LISTENING DETERMINATION, THRESHOLD VALUE (ACCELERATION RHYTHM) (th_acl) | LOWER THAN 2.0 Hz |
| • ACTIVITY (LARGE) DETERMINATION, THRESHOLD VALUE (ACCELERATION RHYTHM) (th_perL) | 4.0 Hz OR HIGHER |
| • CONVERGENCE (HIGH) DETERMINATION, THRESHOLD VALUE (DURATION TIME) (th_perS) | 3 MINUTES OR LONGER |
| • EVENT DISPLAY TIME THRESHOLD VALUE (th_dp) | 5 MINUTES OR LONGER |
| ○ DISPLAY METHOD | --- |
| • EVENT ALIGNMENT SEQUENCE (ASCENDING ORDER / DESCENDING ORDER) | DESCENDING ORDER |
| ○ COST CALCULATION CRITERION | --- |
| • LABOR COSTS PER PERSON AND HOUR | ¥ 10,000 |
| ■ ACTIVE RATIO | --- |
| • ACTIVE DETERMINATION THRESHOLD VALUE (ACCELERATION RHYTHM) (th_act) | 2.0 Hz OR HIGHER |
| • LISTENING TIME DETERMINATION THRESHOLD VALUE (DURATION TIME) (th_lst) | 5 MINUTES OR LONGER |

FIG. 20

| HOUR: 11 MINUTE: | 01 | 02 | 03 | 04 | 05 | 06 | 07 | 08 | 09 | 10 | 11 | 12 | 13 | 14 | 15 | 16 | 17 | 18 | 19 | 20 |
|---|---|---|---|---|---|---|---|---|---|---|---|---|---|---|---|---|---|---|---|---|
| MEETING WITH MR. B | 0 | 0 | 0 | 1 | 1 | 1 | 1 | 1 | 1 | 1 | 1 | 1 | 0 | 0 | 0 | 0 | 0 | 0 | 0 | 0 |
| MEETING WITH MR. C | 0 | 0 | 1 | 1 | 1 | 1 | 1 | 1 | 1 | 1 | 1 | 1 | 1 | 1 | 1 | 1 | 1 | 1 | 0 | 0 |
| MEETING WITH MR. D | 0 | 0 | 1 | 1 | 1 | 1 | 1 | 1 | 1 | 1 | 1 | 1 | 1 | 0 | 0 | 0 | 0 | 0 | 0 | 0 |
| MEETING WITH MR. E | 0 | 0 | 0 | 0 | 1 | 1 | 0 | 0 | 0 | 0 | 0 | 0 | 0 | 0 | 0 | 0 | 0 | 0 | 0 | 0 |
| MEETING MEMBER AT THE SAME TIME | | | A,D | A,B,D | A,B,D,E | A,B,D,E | A,B,D | A,B,D | A,B,D | A,B,D | A,B,D | A,B,D | A,B,C | A,C | A,C | A,C | A,C | A,C | | |
| EVENT FLAG (ComEvent_A1) | 0 | 0 | 1 | 1 | 1 | 1 | 1 | 1 | 1 | 1 | 1 | 1 | 1 | 0 | 0 | 0 | 0 | 0 | 0 | 0 |
| t=03 | | | MEMBER MATCH RATE 67% | | | | | | | | | | | ← EVENT FINISH | | | | | | |
| t=04 | | | | MEMBER MATCH RATE 100% | | | | | | | | | | | | | | | | |
| t=05 | | | | | MEMBER MATCH RATE 75% | | | | | | | | | | | | | | | |
| t=06 | | | | | | MEMBER MATCH RATE 75% | | | | | | | | | | | | | | |
| t=07 | | | | | | | MEMBER MATCH RATE 75% | | | | | | | | | | | | | |
| t=08 | | | | | | | | MEMBER MATCH RATE 100% | | | | | | | | | | | | |
| t=09 | | | | | | | | | MEMBER MATCH RATE 50% | | | | | | | | | | | |
| t=10 | | | | | | | | | | MEMBER MATCH RATE 25% | | | | | | | | | | |
| EVENT FLAG (ComEvent_A2) | 0 | 0 | 0 | 0 | 0 | 0 | 0 | 0 | 0 | 0 | 0 | 0 | 1 | 1 | 1 | 1 | 1 | 1 | 1 | 0 |
| t=11 | | | | | | | | | | | | | MEMBER MATCH RATE 25% | | | | | | ← FINISH | |
| t=12 | | | | | | | | | | | | | | | MEMBER MATCH RATE 25% | | | | | |
| t=13 | | | | | | | | | | | | | | | | MEMBER MATCH RATE 67% | | | | |
| t=14 | | | | | | | | | | | | | | | | | | MEMBER MATCH RATE 67% | | |
| t=15 | | | | | | | | | | | | | | | | | | | MEMBER MATCH RATE 0% | |

FIG. 21A

| HOUR: 11 | | | | | | | | | | | | | | | | | | | | |
|---|---|---|---|---|---|---|---|---|---|---|---|---|---|---|---|---|---|---|---|---|
| MINUTE: | 01 | 02 | 03 | 04 | 05 | 06 | 07 | 08 | 09 | 10 | 11 | 12 | 13 | 14 | 15 | 16 | 17 | 18 | 19 | 20 |
| EVENT FLAG (ComEvent_A1) | 0 | 0 | - | 1 | 1 | 1 | 1 | 1 | 1 | 1 | 1 | 1 | 1 | 0 | 0 | 0 | 0 | 0 | 0 | 0 |
| MR. A | - | - | 2.5 | 3.0 | 3.0 | 1.0 | 0.5 | 1.0 | 1.0 | 1.5 | 2.5 | 4.0 | 3.5 | - | - | - | - | - | - | - |
| MR. B | - | - | - | 3.5 | 3.5 | 4.0 | 3.0 | 2.5 | 1.0 | 1.5 | 3.0 | 3.5 | - | - | - | - | - | - | - | - |
| MR. D | - | - | 1.5 | 1.5 | 2.0 | 2.5 | 2.5 | 3.0 | 2.5 | 1.0 | 1.0 | 0.5 | 1.5 | - | - | - | - | - | - | - |

ACCELERATION [Hz]

FIG. 21B

| MEMBER | PARTICIPATION | ACTIVE TIME | LISTENING TIME | ACTIVE RATIO | LISTENING RATIO |
|---|---|---|---|---|---|
| A | 11 | 6 | 5 | 6/11 = 55% | 5/11 = 45% |
| B | 9 | 7 | 0 | 7/9 = 78% | 0% |
| D | 11 | 5 | 0 | 5/11 = 45% | 0% |

FIG. 22A

| NO | ELEMENT EVENT ID | 12 01 | 02 | 03 | 04 | 05 | 06 | 07 | 08 | 09 | 10 | 11 | 12 | 13 | 14 | 15 | 16 | 17 | 18 | 19 | 20 | 21 | 22 | 23 | 24 | 25 |
|---|---|---|---|---|---|---|---|---|---|---|---|---|---|---|---|---|---|---|---|---|---|---|---|---|---|---|
| [C01] | ComEvent_A3 | 0 | 0 | 1 | 1 | 1 | 1 | 1 | 1 | 1 | 1 | 1 | 1 | 1 | 1 | 1 | 1 | 1 | 1 | 1 | 1 | 1 | 1 | 0 | 0 | 0 |
| [C02] | ComEvent_B1 | 0 | 1 | 1 | 1 | 1 | 1 | 1 | 1 | 1 | 0 | 0 | 0 | 0 | 0 | 0 | 0 | 0 | 0 | 0 | 0 | 0 | 0 | 0 | 0 | 0 |
| [C03] | ComEvent_C1 | 0 | 0 | 0 | 1 | 1 | 1 | 1 | 0 | 0 | 0 | 0 | 0 | 0 | 0 | 0 | 0 | 0 | 0 | 0 | 0 | 0 | 0 | 0 | 0 | 0 |
| [C04] | ComEvent_C2 | 0 | 0 | 0 | 0 | 0 | 0 | 0 | 0 | 0 | 0 | 0 | 0 | 1 | 1 | 1 | 1 | 1 | 1 | 1 | 1 | 1 | 1 | 1 | 0 | 0 |
| [C05] | ComEvent_D1 | 0 | 0 | 1 | 0 | 0 | 0 | 0 | 0 | 1 | 0 | 0 | 0 | 0 | 0 | 0 | 0 | 0 | 0 | 0 | 0 | 0 | 0 | 0 | 0 | 0 |
| [C06] | ComEvent_D2 | 0 | 0 | 0 | 0 | 0 | 0 | 0 | 0 | 0 | 0 | 0 | 0 | 1 | 1 | 1 | 1 | 1 | 1 | 1 | 1 | 0 | 0 | 0 | 0 | 0 |
| [C07] | ComEvent_E1 | 0 | 0 | 0 | 0 | 0 | 0 | 0 | 1 | 1 | 1 | 0 | 0 | 0 | 0 | 0 | 0 | 0 | 0 | 0 | 0 | 0 | 0 | 0 | 0 | 0 |
| [C08] | ComEvent_F1 | 0 | 0 | 0 | 1 | 1 | 1 | 1 | 1 | 0 | 0 | 0 | 0 | 0 | 0 | 0 | 0 | 0 | 0 | 0 | 0 | 0 | 0 | 0 | 0 | 0 |

FIG. 22B

| NO | PARTICIPATION MEMBER | EVENT TIME (MIN) |
|---|---|---|
| [C01] | A, B, C, D | 20 |
| [C02] | A, B, C, D | 16 |
| [C03] | C, F | 5 |
| [C04] | A, B, C, D | 12 |
| [C05] | A, B, C, D | 7 |
| [C06] | A, B, C, D | 8 |
| [C07] | A, B, D, E | 3 |
| [C08] | C, F | 5 |

FIG. 24

| PROCEDURE | | HOUR: 13 MINUTE: 01 | 02 | 03 | 04 | 05 | 06 | 07 | 08 | 09 | 10 | 11 | 12 | 13 | 14 | 15 | 16 | 17 | 18 | 19 | 20 |
|---|---|---|---|---|---|---|---|---|---|---|---|---|---|---|---|---|---|---|---|---|---|
| P1 | TERMINAL WEARING DETERMINATION | 0 | 0 | 1 | 1 | 1 | 1 | 1 | 1 | 1 | 1 | 1 | 1 | 1 | 1 | 1 | 1 | 1 | 1 | 1 | 1 |
| P2-1 | MEETING DETERMINATION | - | - | 0 | 1 | 0 | 0 | 1 | 1 | 0 | 0 | 0 | 0 | 0 | 0 | 0 | 0 | 0 | 0 | 0 | 0 |
| P2-2 | MEETING DETERMINATION (AFTER SUPPLEMENT) SUPPLEMENT COEFFICIENT 4 | - | - | 0 | 1 | 1 | 1 | 1 | 1 | 0 | 0 | 0 | 0 | 0 | 0 | 0 | 0 | 0 | 0 | 0 | 0 |
| P3-1 | ACTIVITY DETERMINATION | - | - | 0 | - | - | - | - | - | 0 | 0 | 1 | 0 | 0 | 1 | 0 | 0 | 0 | 1 | 0 | 1 |
| P3-2 | ACTIVITY DETERMINATION (AFTER SUPPLEMENT) SUPPLEMENT COEFFICIENT 1 | - | - | 0 | - | - | - | - | - | 0 | 0 | 1 | 0 | 0 | 1 | 0 | 0 | 0 | 1 | 1 | 1 |
| P4-1 | INDIVIDUAL WORK DETERMINATION | - | - | 0 | - | - | - | - | - | 1 | 1 | 0 | 1 | 1 | 0 | 1 | 1 | 1 | 0 | 0 | 0 |
| P4-2 | INDIVIDUAL WORK DETERMINATION (AFTER SUPPLEMENT) SUPPLEMENT COEFFICIENT 2 | - | - | 0 | - | - | - | - | - | 1 | 1 | 1 | 1 | 1 | 1 | 1 | 1 | 1 | 0 | 0 | 0 |
| P5 | ACTIVITY (LARGE) DETERMINATION | - | - | 0 | - | - | - | - | - | 0 | 0 | 0 | 0 | 0 | 1 | 0 | 0 | 0 | 0 | 0 | 0 |
| P6 | INDIVIDUAL WORK DETERMINATION (AFTER FORCEDLY DIVIDING INDIVIDUAL WORK EVENT BY ACTIVITY (LARGE)) | - | - | 0 | - | - | - | - | - | 1 | 1 | 1 | 1 | 1 | 0 | 1 | 1 | 1 | 0 | 0 | 0 |

FIG. 25

| PROCEDURE | HOUR: 13 MINUTE: | 01 | 02 | 03 | 04 | 05 | 06 | 07 | 08 | 09 | 10 | 11 | 12 | 13 | 14 | 15 | 16 | 17 | 18 | 19 | 20 |
|---|---|---|---|---|---|---|---|---|---|---|---|---|---|---|---|---|---|---|---|---|---|
| P6 | INDIVIDUAL WORK DETERMINATION (AFTER FORCEDLY DIVIDING INDIVIDUAL WORK EVENT BY ACTIVITY (LARGE)) | 0 | 0 | 0 | 0 | 0 | 0 | 0 | 0 | 1 | 1 | 1 | 1 | 1 | 0 | 1 | 1 | 1 | 0 | 0 | 0 |
| P7 | ACCELERATION RHYTHM | - | - | - | - | - | - | - | - | 1.5 | 0.1 | 0.1 | 1.5 | 1.0 | - | 1.5 | 1.0 | 0.5 | - | - | - |
| P8 | STAGNATION DETERMINATION | - | - | - | - | - | - | - | - | 0 | 1 | 1 | 0 | 0 | - | 0 | 0 | 0 | - | - | - |
| P9 | CONVERGENCE (LOW) DETERMINATION | - | - | - | - | - | - | - | - | 1 | 0 | 0 | 1 | 1 | - | 0 | 0 | 0 | - | - | - |
| P10 | CONVERGENCE (HIGH) DETERMINATION | - | - | - | - | - | - | - | - | 0 | 0 | 0 | 0 | 0 | - | 1 | 1 | 1 | - | - | - |

FIG. 30

ACTIVITY REPORT OUTPUT FILE (ODKO)

ACTIVITY REPORT(KANAE TAKAHASHI)_20110924-0930.txt

ACTIVITY REPORT
NAME: KANAE TAKAHASHI
PERIOD: 24 (SAT)/9 - 30 (FRI)/9/2011
REPORT DATE: 30 (FRI)/9/2011

■ A-COMPANY CASE
[CONFERENCE] PROGRESS REPORT CONFERENCE 30 (FRI)/9/2011
  PARTICIPANTS: SAKAI, YAMASHITA, TAKAHASHI, ITOU
  SELF-EVALUATION: 3
    ADVANCING: PROGRESS REPORT, NEXT-WEEK CLIENT MEETING POLICY DISCUSSION.
    ADVANCED: TO PERSON PRIMARILY RESPONSIBLE FOR MATERIAL PROVISION. WE MADE A DETERMINATION TO AGGREGATE EVALUATION DATA OF MR. SAKAI AND MR. ITOH.
    NEXT THEME: I WILL OBTAIN EVALUATION DATA AND START MATERIAL PROVISION. I WILL BE CAREFUL NOT TO BE DIVERGENT BETWEEN PREVIOUS MATERIAL AND DATA.

[INDIVIDUAL] MATERIAL PROVISION 30 (FRI)/9/2011
  SELF-EVALUATION: 4
    ADVANCING: DATA REDUCTION FOR MAKING NEXT-WEEK MEETING WITH CLIENT, REPORT MATERIAL PROVISION.
    ADVANCED: EASY-TO-UNDERSTAND MATERIAL WAS PROVIDED WITH ADDITION OF COMPARISON WITH OTHER COMPANIES TO SAY ADVANTAGES OF PROPOSAL.
    NEXT THEME: I WILL SUBMIT MATERIAL TO SECTION CHIEF YAMASHITA, AND CORRECT THE MATERIAL BASED ON HIS OPINION.

■ NEXT-YEAR NEW PROPOSAL PROJECT
[CONFERENCE] REGULAR CONFERENCE 10:00 - 11:30/28 (WED)/9/2011
  PARTICIPANTS: TAKAHASHI, HIRAI, NOMURA, HATA
  SELF-EVALUATION: 3
    ADVANCING: REALIZATION OF PROPOSAL ITEMS

FIG. 31

MOTION RHYTHM TAPESTRY
(SSDB_ACCTP_1min)

| TIME<br>(DBTM) | USER 1001<br>(DBA1001) | USER 1002<br>(DBA1002) | USER 1003<br>(DBA1003) |
|---|---|---|---|
| 20070224-<br>00:00:00.00 | 2.35 | Null | 3.65 |
| 20070224-<br>00:01:00.00 | 3.10 | Null | 3.40 |
| ⋮ | ⋮ | ⋮ | ⋮ |
| 20070224-<br>23:59:00.00 | 1.05 | 0.05 | 0.00 |

FIG. 32

MEETING TAPESTRY
(SSDB_IRTP_1min)

| TIME<br>(DBTM) | USER 1001<br>(DBA1001) | USER 1002<br>(DBA1002) | USER 1003<br>(DBA1003) |
|---|---|---|---|
| ⋮ | ⋮ | ⋮ | ⋮ |
| 20070224-<br>10:00:00.00 | 1002, 1005 | 1001, 1005 | Null |
| 20070224-<br>10:01:00.00 | 1005 | Null | Null |
| ⋮ | ⋮ | ⋮ | ⋮ |
| 20070224-<br>13:25:00.00 | 1002, 1003 | 1001, 1003 | 1001, 1002 |
| ⋮ | ⋮ | ⋮ | ⋮ |

US 9,111,242 B2

EVENT DATA PROCESSING APPARATUS

CLAIM OF PRIORITY

The present application claims priority from Japanese patent application JP 2011-251221 filed on Nov. 17, 2011, the content of which is hereby incorporated by reference into this application.

FIELD OF THE INVENTION

The present invention relates to a technique for displaying activity data of a person which is obtained by a sensor terminal.

BACKGROUND OF THE INVENTION

In recent years, business in distant offices, and project type business (one person is assigned to a plurality of project teams at the same time, and has a plurality of bosses) are increased, thereby making it difficult that a boss and a subordinate, or members belonging to a team understand business contents with each other. However, in order to appropriately distribute the amount of business, or effectively utilize information such as know-how or know-who, there is a need to widely share an event or a situation in business. For that reason, it is effective that the picture of business is collected as sensor data, and the event is displayed with a segment understandable by a person.

A technique has been known in which the separation of topics during a meeting is found from an operational log of a file displayed on a PC screen (for example, Japanese Unexamined Patent Application Publication No. 2009-64275). A technique has been known in which the appearance and disappearance of a group formed from data on lodging of people is determined (for example, Japanese Patent No. 4525318). Also, a technique has been known in which the exchange of conversation among persons is put in chronological order by a microphone (For example, Japanese Unexamined Patent Application Publication No. 2007-27918). Also, a technique has been known in which work contents specified by a sensor worn on the person and the operational log of a PC are subjected to noise removal processing, and specified as a sequence of works (for example, Japanese Unexamined Patent Application Publication No. 2009-211574). Also, a technique has been known in which, for the purpose of improving the quality of discussion during the meeting, a request for statement is issued focusing attention on a time during which no statement is made (for example, Japanese Unexamined Patent Application Publication No. Hei-8 (1996)-274888).

SUMMARY OF THE INVENTION

A problem to be solved by the present invention resides in that successive sensor data on the activity of the person is appropriately separated and displayed so as to be linked with the event in a memory of the person. In particular, for the purpose of white-collar business, a meeting event in which a plurality of persons gathers together ad hoc for a conversation, or an individual work event in which an individual writes a document while facing the PC is extracted to separate the activity during a business. In order to extract the meeting event, there is a need to specify members who participates in the meeting event, and a start time and an end time thereof, on the basis of data that the persons meet each other face-to-face.

Under the above circumstances, only the data during the meeting is intended in Japanese Unexamined Patent Application Publication No. 2009-64275. Also, only the group at a location where the sensor is installed can be detected in Japanese Patent No. 4525318. Therefore, the above problem cannot be sufficiently solved. Also, Japanese Patent No. 4525318 and Japanese Unexamined Patent Application Publication No. 2009-211574 fail to disclose a method for extracting the formation and dissolution of a flexible group since a plurality of persons gathers together ad hoc until the persons dissolve as a sequence of collected events.

The above problem can be solved by provision of an event data processing apparatus including: a recording module that stores meeting information including a time, person information, and data indicating that the persons meet each other therein; an input module that receives an input of the meeting information, and records the meeting information in the recording module; a control module that calculates the number of meeting persons who meet each other according to the meeting information of the input received by the input module, calculates a meeting person number difference which is a difference in the number of meeting persons between a first number of meeting persons at a first time and a second number of meeting persons at a second time, determines that a continuous communication is conducted between the first time and the second time if the meeting person number difference is equal to or smaller than a meeting person number threshold value which is a predetermined threshold value, and records persons included in the first number of meeting persons and the second number of meeting persons, the first time, and the second time in association with event identifiers for identifying events; and an output module that outputs the recorded event identifiers.

According to the present invention, even when group members are changed with a person who participates in a conversation on the way, or a person who leaves the conversation on the way, if most of the group members are not changed, the group members are extracted as a sequence of events. Even when another event sequentially appears with the same location or a specific person, if the group members are largely changed, the event is distinguished as another event. Also, even when a plurality of different groups occurs at the same time, those groups are distinguished as different events. As a result, information on the event of the meeting communication which naturally appears or disappears at a workplace can be extracted by specifying the start time, the end time, and the group members, with the use of only the data on whether the persons meet each other, or not.

BRIEF DESCRIPTION OF THE DRAWINGS

FIG. 7 is a diagram illustrating an example of a screen of the web application;

FIG. 10 is a diagram illustrating an example of a user ID correspondence table;

FIG. 11 is a diagram illustrating an example of a group control list;

FIG. 12 is a diagram illustrating an example of a sensing database (acceleration data);

FIG. 13A is a diagram illustrating one example of a sensing database (meeting data), and FIG. 13B is a diagram illustrating another example of the sensing database (meeting data);

FIG. 14 is a diagram illustrating an example of a meeting event table;

FIG. 15 is a diagram illustrating an example of an individual operation event table;

FIG. 16 is a diagram illustrating an example of a subjective information table;

FIG. 17 is a diagram illustrating an example of a data processing variable screen;

FIG. 20 is a diagram illustrating an example of a procedure of the meeting element event processing;

FIG. 21A is a table related to one example of a procedure of meeting element event feature quantity extraction, and FIG. 21B is a table related to another example of the procedure of the meeting element event feature quantity extraction;

FIG. 22A is a table related to one example of a procedure of the meeting element event associate processing, and FIG. 21B is a table related to another example of the procedure of the meeting element event associate processing;

FIG. 24 is a flowchart illustrating an example of a procedure of the individual work event extraction processing;

FIG. 25 is a diagram illustrating an example of a procedure of individual work event feature quantity extraction processing;

FIG. 30 is a diagram illustrating an example of an activity report output file;

FIG. 31 is a diagram illustrating an example of a motion rhythm tapestry; and

FIG. 32 is a diagram illustrating an example of a meeting tapestry.

DETAILED DESCRIPTION OF THE PREFERRED EMBODIMENTS

The present invention pertains to a sensing data display device that displays sensing data which extracts and displays a meeting event in which a plurality of persons gathers together and dissolves, with the use of data related to facing between persons. Hereinafter, the present invention will be described with reference to the accompanying drawings.

First Embodiment

First, a first embodiment of the present invention will be described with reference to the accompanying drawings.

Figure 1:
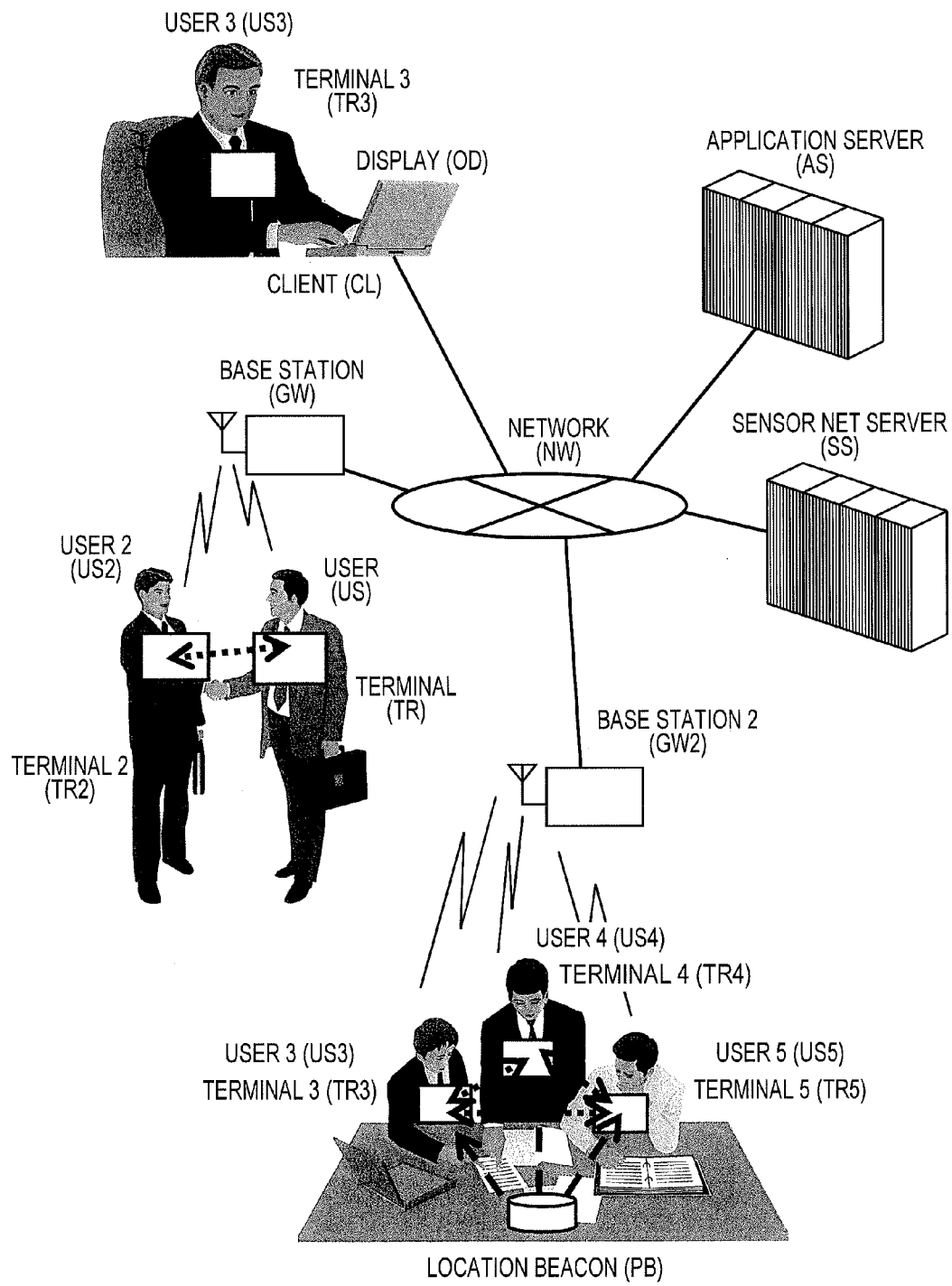
FIG. 1 is a diagram exemplarily illustrating a configuration and a usage scene of a sensing data display device.

<FIG. 1: System Outline>

FIG. 1 illustrates a system outline of the present invention. In the first embodiment, members of an organization wear respective sensor terminals (TR, TR2 to TR5: hereinafter, all of the sensor terminals are referred to as "TR" if individuals are not discriminated) as users (US, US2 to US5: hereinafter, all of the users are referred to as "US" if the individuals are not discriminated). Sensing data related to the actions of the respective members and the interactions among the members are acquired by the respective terminal (TR). In the interactions, when the users (US) meet each other, infrared rays are transmitted and received among the respective terminals (TR) to detect a meeting state. In a location such as a conference room where a large number of persons gathers together and has a conversation, there is a case in which the infrared rays from the terminals (TR) of all participants do not reach each other. For that reason, a location beacon (PB) can be installed to compensate the meeting data among the persons. The location beacon (PB) transmits an ID indicative of the location with infrared rays, and each of the terminals (TR) receives the ID to detect that the user (US) stays at that location.

The acquired sensing data is transmitted to a base station (GW, GW2: hereinafter, all of the base stations are referred to as "GW" if the individuals are not discriminated) by wireless or wired connections, and then stored in a sensor net server (SS) through a network (NW). The sensor net server (SS) periodically preprocesses the sensing data, and stores the preprocessed sensing data as secondary data easy to deal with. In order to create a screen to be watched by the user, an application server (AS) periodically acquires the secondary data from the sensor net server (SS), and extracts the meeting event or the individual work event from the data. The user (US) inputs an account and a password to a client (CL) to access to a web page of the application server (AS), and browses content for visitors on a display (OD) of the client (CL).

Figure 2:
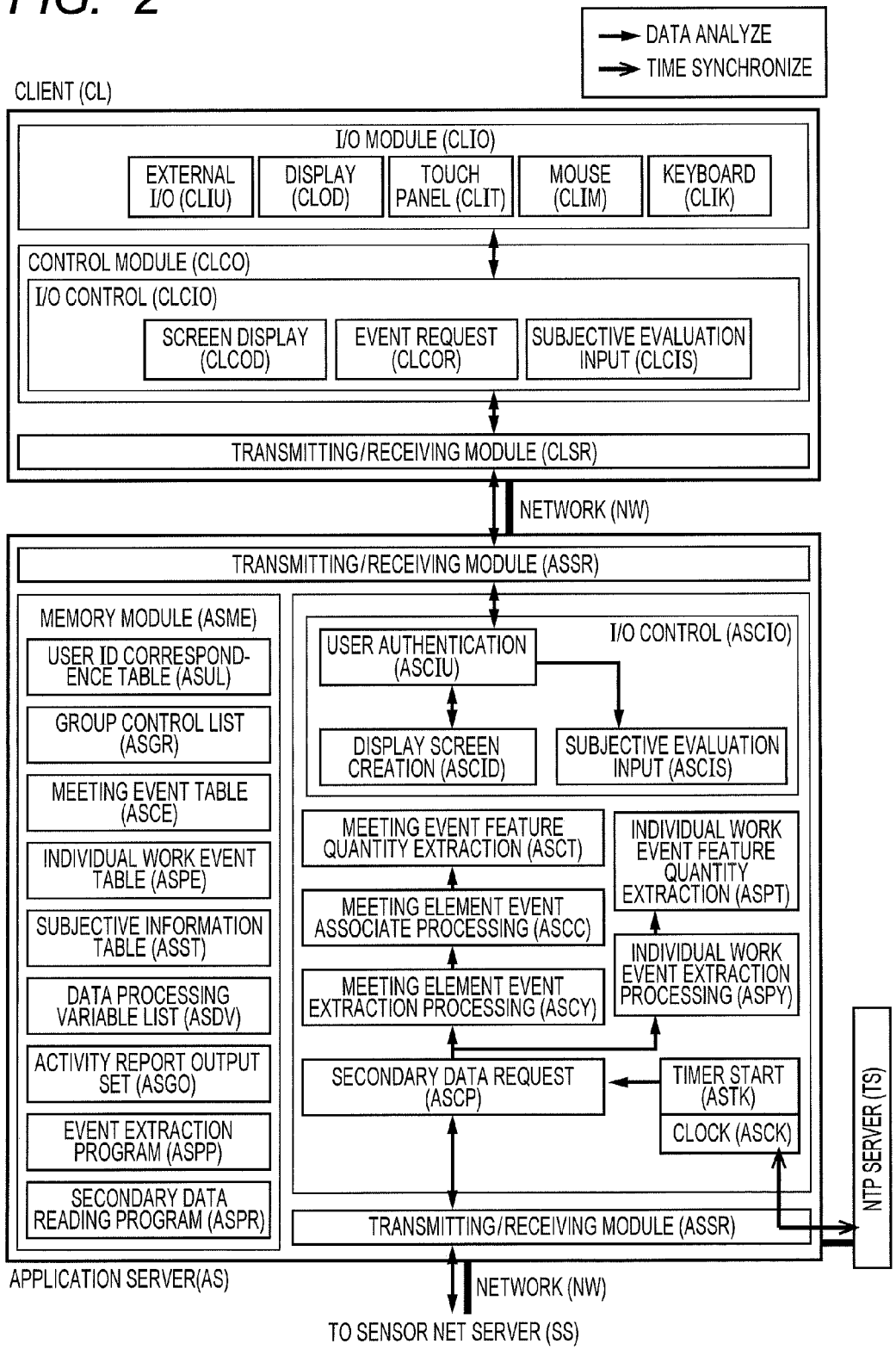
FIG. 2 is a diagram exemplarily illustrating a configuration of a client and an application server.
Figure 3:
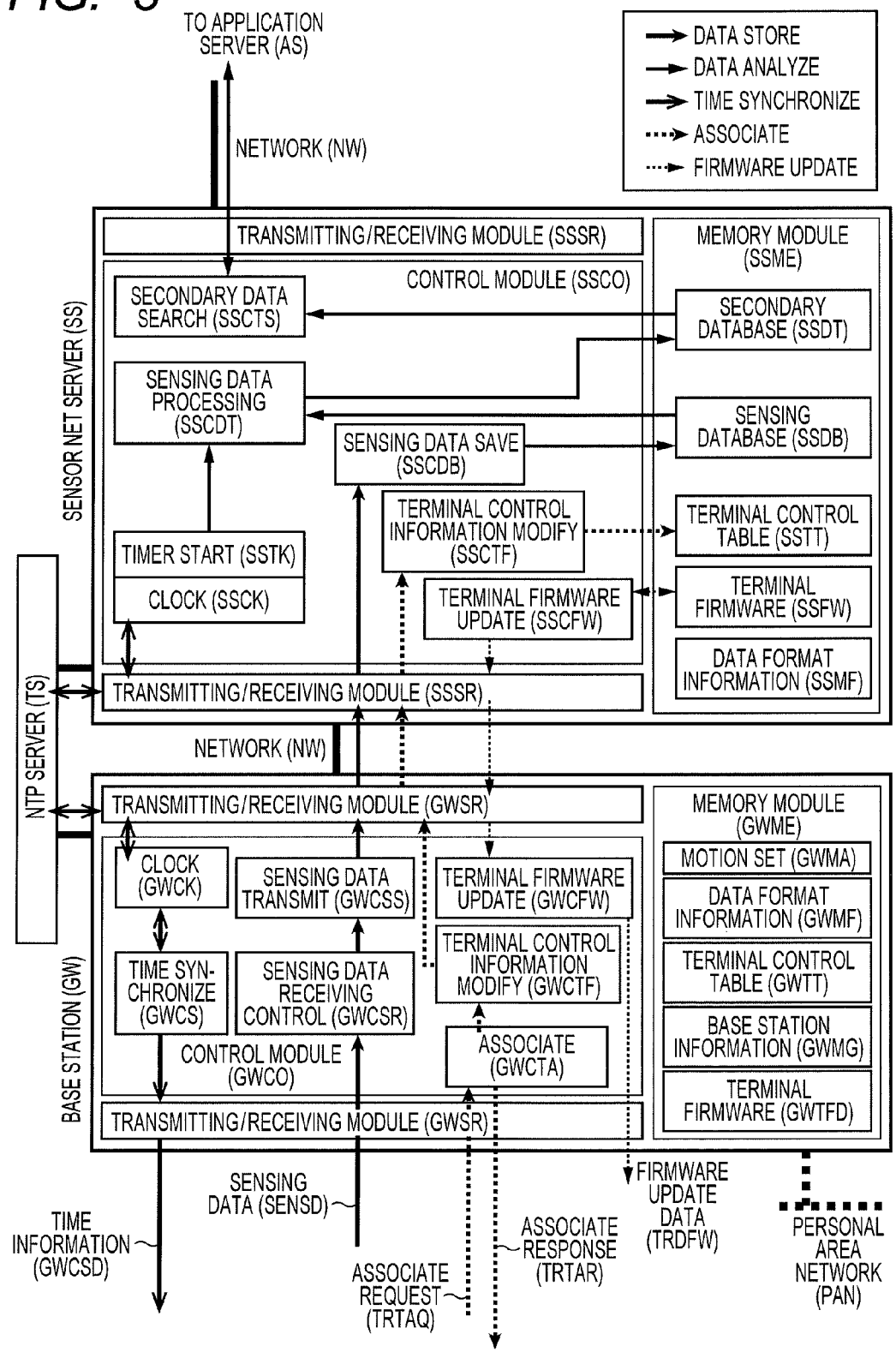
FIG. 3 is a diagram exemplarily illustrating a configuration of a sensor net server and a base station.
Figure 4:
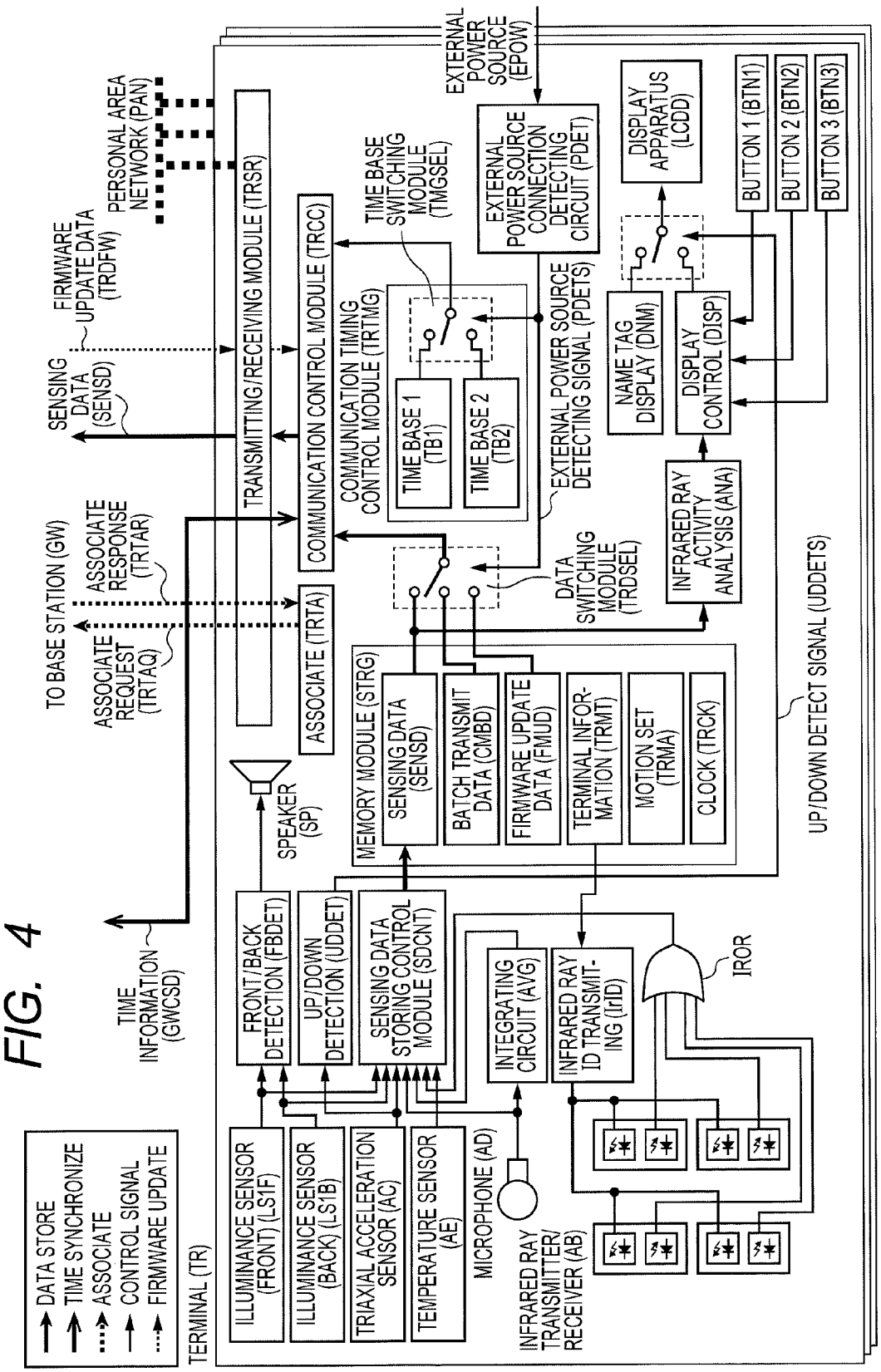
FIG. 4 is a diagram exemplarily illustrating a configuration of a terminal.

<FIGS. 2 to 4: Block Diagrams of Overall System>

FIGS. 2 to 4 are block diagrams illustrating an overall configuration of a sensor network system that realizes a sensing data display device according to the embodiment of the present invention. The sensor network system is divided for illustration purpose, but the respective processing illustrated in the respective figures is executed in cooperation with each other. Also, the respective functions in the drawings are realized by cooperation between hardware and software (*In the Japanese Patent Law, that information processing is conducted by cooperation between software and hardware must be clarified). Each of those constituent elements includes a control module, a memory module, and a transmitting/receiving module as is apparent from FIGS. 2 to 4. The control module is configured by a central processing unit (CPU, not shown) which is a normal processing unit such as a computer, the memory module is configured by a memory device such as a semiconductor memory device or a magnetic memory device, and the transmitting/receiving module is configured by a network interface such as a cable or radio. In addition, a clock, or the like is provided as occasion demands.

The sensing data related to the actions of the persons who wear the respective terminals (TR) and communication are acquired by the terminal (TR), and the sensing data is stored in the sensor net server (SS) through the base station (GW). Also, the application server (AS) extracts the meeting event or the individual work event from the sensing data, and submits the result. FIGS. 2 to 4 illustrate a sequence of those flows.

Six types of arrows different in shape in FIGS. 2 to 4 represent flows of data or signals for time synchronize, associates, storage of the acquired sensing data, the sensing data analysis, firmware update, and a control signal.

<FIG. 2: Overall System 1 (CL.AS)>

FIG. 2 illustrates a configuration of the client (CL) and the application server (AS) according to the embodiment.

<Client (CL)>

The client (CL) contacts with the user (US), and inputs and outputs data. The client (CL) includes an I/O module (CLIO), a transmitting/receiving module (CLSR), a memory module (not shown), and a control module (CLCO).

The I/O module (CLIO) functions as an interface with the user (US). The I/O module (CLIO) includes a display (CLOD), a touch panel (CLIT), a keyboard (CLIK), and a mouse (CLIM). Another I/O device can be connected to an external I/O (CLIU) as occasion demands.

The display (CLOD) is an image display device such as a CRT (Cathode-Ray Tube) or liquid crystal display. The display (CLOD) may include a printer. When the touch panel (CLIT) is used for assisting an input by the user, the touch panel (CLIT) is so located as to overlap with the display (OD) of the display (CLOD), and it can appear that output and input are conducted on the same screen.

The transmitting/receiving module (CLSR) transmits or receives data or instructions with respect to a device connected to the application server (AS) or another network. More specifically, the transmitting/receiving module (CLSR) transmits a request for the display screen to the application server (AS), and receives an image corresponding to the request.

The memory module (not shown) is configured by an external recording device such as a hard disc, a memory, or an SD card. The memory module (not shown) may store a history of display or a login ID of the user (US) therein.

<Application Server (AS)>

The application server (AS) processes and analyzes the secondary data of the sensing data, and creates content information (image in most cases, but may be other data such as a moving image, text data, or voice data) to be submitted to the user through the client (CL).

The application server (AS) includes a transmitting/receiving module (ASSR), a memory module (ASME), and a control module (ASCO).

The transmitting/receiving module (ASSR) transmits and receives data with respect to the sensor net server (SS), an NTP server (TS), the client (CL), and an individual client (CP) through the network (NW), and conducts a communication control for transmission and reception.

The memory module (ASME) is configured by an external recording device such as a hard disc, a memory, or an SD card. The memory module (ASME) stores the created content information, a program for creating the content, and the other data related to the content creation. More specifically, the memory module (ASME) includes a user ID correspondence table (ASUL), a group control list (ASGR), a meeting event table (ASCE), an individual work event table (ASPE), a subjective information table (ASST), a data processing variable list (ASDV), an activity report output set (ASGO), an event extraction program (ASPP), and a secondary data reading program (ASPR) therein.

The user ID correspondence table (ASUL) is a comparison table of IDs of the terminals (TR), and names of the users (US) who wear the respective terminals, user IDs, affiliations, mail addresses, ID correspondences, or the like. The user ID correspondence table (ASUL) is referred to when IDs received from partners when the persons meet each other are linked with the names, or the display content is changed according to the ID that has logged in to a web. FIG. 10 illustrates a specific example thereof.

The group control list (ASGR) is a list that manages a group set on a web application. FIG. 11 illustrates a specific example thereof. The group is not a formal organizational framework, but can be freely created by the users (US). If the group is defined, an event of the person belonging to the same group can be browsed, or indexes of the motions or conferences can be averaged and displayed on a group basis. The group control list (ASGR) manages information related to each group No., a start date and an end date when the group is effective, a group name, a member list, and an ID correspondence thereof. The browse of data and the authority of control are different depending on the ID correspondence of the member. An owner is a person who creates the group, and has an authority to change information the group control list (ASGR). Also, the owner is treated as a member with respect to disclosure and browse. Each member discloses his own data to the other members (including a supervisor) of the group, and also can browse data on the other members of the group. The supervisor is not a member who conducts business together directly, but a person who is to grasp a status of the group (for example, superior and people involved in another department). The supervisor has an authority to browse data on the members of the group, but does not disclose his own data to the group.

The meeting event table (ASCE) is a table that stores information on the meeting event extracted by a sequence of procession (ASCY, ASCC, ASCT) related to the meeting event therein. Also, the individual work event table (ASPE) is a table that stores information on the individual work event extracted by a sequence of processing (ASPY, ASPT) related to the individual work event therein. Also, the subjective information table (ASST) is a table that stores the subjective information input by the user (US) in association with the meeting event or the individual work event therein.

The data processing variable list (ASDV) is a table that stores a variety of variables related to data processing, which are set by a manager of the web application, therein.

Figure 29:
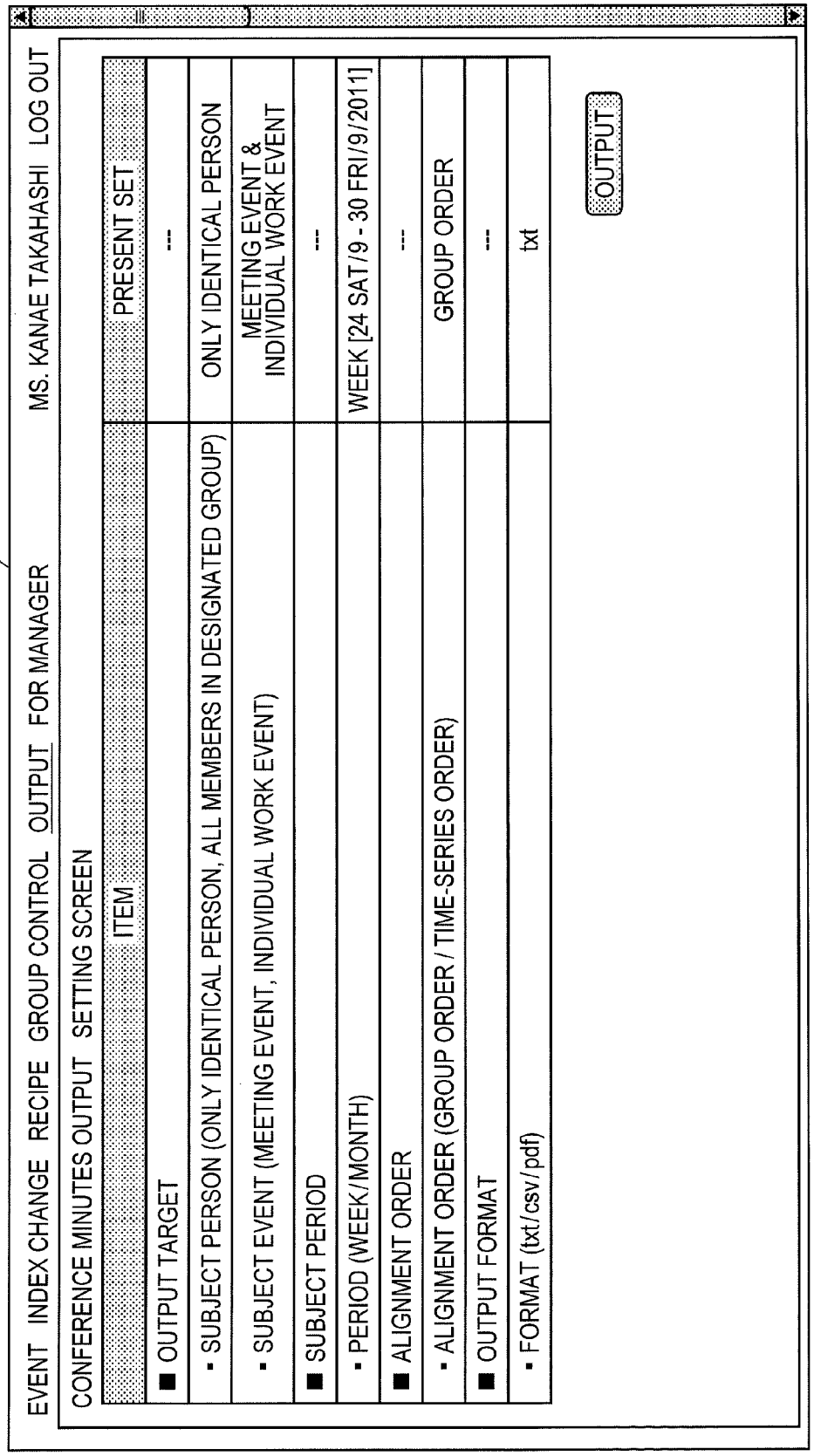
FIG. 29 is a diagram illustrating an example of an activity report output setting screen.

The activity report output set (ASGO) is to store setting conditions for outputting subjective evaluation information of the user which is stored in the subjective information table (ASST), as exemplified by an activity report output file illustrated in FIG. 30. The output conditions are set by allowing the user (US) to operate, for example, an activity report output setting screen (ODKS) of FIG. 29.

The event extraction program (ASPP) is a program for executing processing (ASCY, ASCC, ASCT, ASPY, ASPT) related to the event extraction.

The secondary data reading program (ASPR) is a read program that meets the format of the secondary data (for example, data on a list of IDs of meeting partners on a minute basis or an acceleration rhythm) received from the sensor net server (SS) in a secondary data request (ASCP).

The control module (ASCO) includes a CPU (not shown), and executes a process for processing sensor data or subjective evaluation information and outputting the web content to be submitted to the user.

An I/O control (ASCIO) conducts a control when the user browses event data through the web application, or inputs the subjective evaluation information (implementation, reflection thereof, next assignment) on the event. After user authentication (ASCIU) when the user logs in to the web application, the I/O control (ASCIO) conducts display screen creation (ASCID) configuring a screen by switching date and type of subject data or subject group to another according to user's operation, and a subjective evaluation input (ASCIS)

that stores the input subjective evaluation information in the subjective information table (ASST) in association with the events.

Also, the application server (AS) has a clock (ASCK), and is connected to an external NTP server (TS) to maintain an accurate clock.

When the clock reaches a predetermined clock, a timer starts (ASTK) to start the secondary data reading program (ASPR) and the event extraction program (ASPP). In the secondary data request (ASCP), a period, a subject person, and a type necessary for the sensor net server (SS) are designated to make a request for the secondary data, and the second data is received. With the use of the received data, meeting element event extraction processing (ASCY), meeting element event associate processing (ASCC), and meeting element event extraction processing (ASCT) are implemented in order in the processing of the meeting event. A method of starting the program may be manually conducted, or may be triggered by allowing the sensor net server (SS) to receive data of a specific pattern.

<FIG. 3: Overall System 2 (SS.IS)>

FIG. 3 illustrates a configuration of the sensor net server (SS) and the base station (GW) according to the embodiment.

<Sensor Net Server (SS)>

The sensor net server (SS) manages data collected from all of the terminals (TR). More specifically, the sensor net server (SS) stores the sensing data transmitted from the base station (GW) in a sensing database (SSDB), and also transmits the sensing data and the secondary data on the basis of requests from the application server (AS) and the client (CL). Further, the sensor net server (SS) manages information on the base station (GW) and the terminals (TR) managed by the base station (GW) as needed. Also, the sensor net server (SS) is an origin of a control command for updating the firmware of the terminals (TR).

The sensor net server (SS) includes a transmitting/receiving module (SSSR), a memory module (SSME), and a control module (SSCO).

The transmitting/receiving module (SSSR) transmits and receives data with respect to the base station (GW), the application server (AS), the individual client (CP), and the client (CL), and conducts a communication control in the transmission and reception.

The memory module (SSME) is configured by a data memory device such as a hard disc, and stores at least the sensing database (SSDB), a secondary database (SSDT), data format information (SSMF), a terminal control table (SSTT), and a terminal firmware (SSFW). Further, the memory module (SSME) stores a program executed by a CPU (not shown) of the control module (SSCO) therein.

The sensing database (SSDB) is a database for recording the sensing data acquired by the respective terminals (TR), information on the terminals (TR), and information on the base station (GW) through which the sensing data transmitted from the respective terminals (TR) passes. A column is created for each element of data such as acceleration or humidity, and data is controlled. Also, a table may be created for each element of data. In both of those cases, all of the data is controlled by associating terminal information (TRMT) which are IDs of the acquired terminals (TR) with information related to times at which sensing is conducted.

The secondary database (SSDT) is a database that stores results obtained by subjecting data of the sensing database (SSDB) to sensing data processing (SSCDT) therein. The secondary data stored in the secondary database (SSDT) is standardized data which has been preprocessed. The secondary database (SSDT) is saved in a state where noise is removed from the secondary database (SSDT), and a format suitable for creating a basic content, for example, a total meeting time between two arbitrary users (US) is output in a matrix format, for example, at daily intervals. The application server (AS) has a rule that not the sensing data that has not yet been processed, but the secondary data is used. As a result, a program for application can be developed not taking the characteristics of the sensing data depending on the terminals (TR) and a communication status such as the removal of noise into account. As the database, the secondary database (SSDT) sharing similarity with the sensing database (SSDB) may be used, and the table may be merely shared. Also, a basic content creation (ASCBC) may acquire data before the sensing data processing (SSCDT) from the sensing database (SSDB) as occasion demands.

In the data format information (SSMF) are recorded information indicative of a method of cutting the sensing data tagged by the base station (GW) in a data format for communication and recording the sensing data, a method of recording the secondary data that has been subjected to the sensing data processing (SSCDT) in the secondary database (SSDT), and a respond method to the data request. After the data has been received, the data format information (SSMF) is referred to before transmitting the data, and the conversion of the data format and the data allocation are conducted.

The terminal control table (SSTT) is a table that records which terminal (TR) is currently controlled by which base station (GW). The terminal control table (SSTT) is updated when a terminal (TR) is newly added under the control of the base station (GW). Also, when the base station (GW) and the terminal (TR) are connected to each other via wires, the terminal control information may not be always controlled.

The terminal firmware (SSFW) stores a program for operating the terminals. When terminal firmware update (SSCFW) is conducted, the terminal firmware (SSFW) is updated, transmitted to the base station (GW) through the network (NW), and further transmitted to the terminals (TR) through a personal area network (PAN) to update the firmware within the terminals (TR) (FMUD).

The control module (SSCO) includes a CPU (not shown), and controls the transmission and reception of the sensing data, and recording and extraction of the database. More specifically, the CPU executes the program stored in the memory module (SSME), to thereby execute processing such as sensing data save (SSCDB), terminal control information modification (SSTF), the terminal firmware update (SSCFW), the sensing data processing (SSCDT), and secondary data search (SSCTS).

The sensing data save (SSCDB) is processing of receiving the sensing data transmitted from the base station (GW), and storing the sensing data in the sensing database (SSDB). The time information, the terminal ID, and additional information such as a time at which the sensing data passes through the base station are stored together in the database as one record.

A clock (SSCK) is periodically connected to the external NTP server (TS) to hold the Standard Time. When the clock (SSCK) meets a time designated in advance, or a specific condition, the clock (SSCK) starts a timer (SSTK) for the sensing data processing (SSCDT).

The sensing data processing (SSCDT) preprocesses the sensing data from the sensing database (SSDB) and the data acquired by the terminals (TR) through a method designated by the data format information (SSMF) to create secondary data. The secondary data is stored in the secondary database (SSDT). The sensing data processing (SSCDT) starts at regular intervals, and processes newly added sensing data to maintain a state in which the secondary database is always updated.

Upon receiving a request from the application server (AS), the secondary data search (SSCTS) extracts the secondary data responsive to the request from the secondary database (SSDT), and returns the extracted secondary data to a requester. In this situation, the secondary data search (SSCTS) searches the secondary data on the basis of the tag information such as date or the user ID which are allocated to the secondary data.

Upon receiving a command for modifying the terminal control information from the base station (GW), the terminal control information modification (SSTF) updates the terminal control table (SSTT). This is because lists of the terminals (TR) which are under the respective base stations (GW) are always grasped.

When there is a need to update the firmware of the terminals (TR) manually or automatically, the terminal firmware update (SSCFW) updates the terminal firmware (SSFW) within the memory module (SSME). Further, the terminal firmware update (SSCFW) issues an instruction to update the firmware of the subordinate terminals (TR) to the base station (GW). Also, the terminal firmware update (SSCFW) receives a response that the firmware update has been completed at the respective terminals (TR), and continues the above operation until update of all the terminals (TR) has been completed.

<Base Station (GW)>

The base station (GW) has a function of mediating between the terminals (TR) and the sensor net server (SS). When the terminals (TR) and the base station (GW) are connected to each other wirelessly, a plurality of the base stations (GW) is so arranged as to cover areas such as rooms and workplaces taking a range of radio into consideration. When the terminals (TR) and the base station (GW) are connected to each other via wires, an upper limit of the number of terminals (TR) to be controlled is set on the basis of a processing capacity of the base station (GW).

The base station (GW) includes a transmitting/receiving module (GWSR), a memory module (GWME), and a control module (GWCO).

The transmitting/receiving module (GWSR) receives data from the terminals (TR) by wireless or wired connections, and transmits the data to the sensor net server (SS) by the wired or wireless connections. When the wireless connection is used for transmission and reception, the transmitting/receiving module (GWSR) is provided with an antenna for receiving the radio. Also, as occasion demands, a congestion control, that is, a timing control of the communication is conducted so that, when the sensing data is transmitted and received, the data is not defective. Also, the types of received data are discriminated. More specifically, whether the received data is general sensing data, data for associates, or a response of time synchronization, is discriminated on the basis of a header part of the data, and those data is delivered to respective appropriate functions.

The memory module (GWME) is configured by an external memory device (not shown) such as a hard disc, a memory, or an SD card. In the memory module (GWME) are stored motion set (GWMA), data format information (GWMF), a terminal control table (GWTT), base station information (GWMG), and a terminal firmware (GWTFD). The motion set (GWMA) includes information indicative of a method of operating the base station (GW). The data format information (GWMF) includes information indicative of a data format for communication, and information necessary to tag the sensing data. The terminal control table (GWTT) includes the terminal information (TRMT) on the subordinate terminals (TR) that can be currently associated with each other, and local IDs distributed to control those terminals (TR). If there is no need to connect to the terminals (TR) via wires to always grasp the subordinate terminals (TR), the terminal control table (GWTT) may be omitted. The base station information (GWMG) includes information on an address of the base station (GW) per se. The terminal firmware (GWTFD) stores a program for operating the terminals, and upon receiving an instruction and a new terminal firmware from the sensor net server (SS), the terminal firmware (GWTFD) transmits firmware update data (TRDFW) to the terminals (TR) through the personal area network (PAN) (GWCFW).

In the memory module (GWME) may be stored a program to be executed by a CPU (not shown) of the control module (GWCO).

The control module (GWCO) includes a CPU (not shown). The CPU executes the program stored in the memory module (GWME), to thereby control a timing at which the sensing data is received from the terminals (TR), processing of the sensing data, timings of transmitting and receiving the sensing data with respect to the terminals (TR) and the sensor net server (SS), and a timing of the time synchronization. More specifically, the CPU executes processing such as a sensing data receiving control (GWCSR), sensing data transmission (GWCSS), associate (GWCTA), terminal control information modification (GWCTF), terminal firmware update (GWCFW), and time synchronization (GWCS).

A clock (GWCK) holds time information. The time information is updated at regular intervals. More specifically, the time information on the clock (GWCK) is modified by the time information acquired from the NTP (network time protocol) server (TS) at regular intervals.

The time synchronize (GWCS) is triggered at regular intervals, or by connecting the terminals (TR) to the base station (GW) to transmit the time information to the subordinate terminals (TR). As a result, the plurality of terminals (TR) is synchronized with the time of the clock (GWCK) of the base station (GW).

The associate (GWCTA) conducts an associate response (TRTAR) for transmitting the allocated local IDs to the respective terminals (TR) in response to an associate request (TRTAQ) transmitted from the terminals (TR). When the associate is satisfied, the associate (GWCTA) conducts the terminal control information modification (GWCTF) for modifying the terminal control table (GWTT).

The sensing data receiving control (GWCSR) receives packets of sensing data (SENSD) transmitted from the terminals (TR). The sensing data receiving control (GWCSR) reads a header of the packet of data, discriminates the type of data, and conducts congestion control so as not to converge data from a large number of terminals (TR) at the same time.

The sensing data transmission (GWCSS) allocates ID of the base station through which data passes, and time data at that time to the sensing data, and transmits the sensing data to the sensor net server (SS).

<FIG. 4: Overall System 3 (TR)>

FIG. 4 illustrates a configuration a certain terminal (TR) which is an example of the sensor node. In this example, the terminal (TR) has a name tag shape, and it is assumed that the terminal (TR) is worn around a person's neck. This is an example, and the terminal (TR) may have another shape. Inmost cases, a plurality of the terminals (TR) exists in a sequence of system, and persons belonging to the organization wear the respective terminals (TR). Each of the terminals (TR) mounts a variety of sensors such as a plurality of the infrared ray transmitters/receivers (AB) for detecting a meeting status of the persons, a triaxial acceleration sensor (AC) for detecting the operation of wearers, a microphone (AD) for detecting a speed of the wearers and surrounding sound, illumination sensors (LS1F, LS1B) for detecting front and back of the terminal, and a temperature sensor (AE) therein. The mounted sensors are exemplified, and another sensor may be used for detecting the meeting statuses and motions of the wearers In this embodiment, four pairs of infrared ray transmitters/receivers are mounted. The infrared ray transmitters/receivers (AB) continue to periodically transmit the terminal information (TRMT) which is unique identification information of each terminal (TR) toward a front direction. When a person who wears another terminal (TR) is located substantially at the front (for example, front or obliquely front), one terminal (TR) and another terminal (TR) exchange the respective terminal information (TRMT) by infrared rays. For that reason, it can be recorded that who meets whom. Also, upon receiving the terminal information (TRMT), a visitor detector (CLVD) can detect which user (US) browses the display (CLOD) of the client (CL). Conversely, upon receiving a detector ID (CLVDID) transmitted from the visitor detector (CLVD), the terminal (TR) can record that the user (US) has stayed at an installation location of the client (CL).

Each of the infrared ray transmitters/receivers is generally configured by the combination of an infrared-emitting diode for transmitting infrared rays and an infrared phototransistor. An infrared ID transmitter (IrID) creates the terminal information (TRMT) which is its ID, and transfers the terminal information (TRMT) to the infrared-emitting diode of the infrared ray transmitting/receiving modules. In this embodiment, the same data is transmitted to the plurality of infrared transmitting/receiving modules to light all of the infrared emitting diodes. It is needless to say that another data may be output at respective independent timing.

The data received by the infrared phototransistors of the infrared ray transmitters/receivers (AB) is ORed by an OR circuit (IROR). That is, if the ID is received by at least one infrared ray receiver, the ID is recognized by the terminal. It is needless to say that a plurality of ID receiving circuits may be provided, independently. In this case, since a transmitting/receiving state can be grasped for each of the infrared transmitting/receiving modules, it is possible to obtain additional information on which direction another terminal facing one terminal is in.

The sensing data (SENSD) detected by the sensor is stored in a memory module (STRG) by a sensing data storing control module (SDCNT). The sensing data (SENSD) is processed into a transmitting packet by a communication control module (TRCC), and transmitted to the base station (GW) by a transmitting/receiving module (TRSR).

A communication timing control module (TRTMG) is to extract the sensing data (SENSD) from the memory module (STRG), and determine a timing of transmission by the wireless or wired connections. The communication timing control module (TRTMG) has a plurality of time bases for determining a plurality of timing.

The data stored in the memory module includes the sensing data (SENSD) detected by the sensor previously as well as batch transmission data (CMBD) accumulated in the past, and firmware update data (FMUD) for updating the firmware which is an operation program of the terminal.

The terminal (TR) according to this embodiment detects that an external power source (EPOW) is connected, by an external power source connection detecting circuit (PFET), and generates an external power source detection signal (PDETS). A time base switching module (TMGSEL) that switches a transmission timing generated by the timing control module (TRTMG) in response to the external power source detection signal (PDETS), or a data switching module (TRDSEL) that switches data communicated wirelessly has a configuration unique to the terminals (TR). FIG. 4 exemplifies a configuration in which the time base switching module (TMGSEL) switches the transmission timing between two time bases of a time base 1 (TB1) and a time base (TB2) in response to the external power source detection signal (PDETS). A data switching module (TRDSEL) switches data to be communicated to the sensing data (SENSD) obtained by the sensor, the batch transmission data (CMBD) accumulated in the past, or the firmware update data (FMUD) in response to the external power source detection signal (PDETS).

The illumination sensors (LS1F, LS1B) are mounted on front and back surfaces of each terminal (TR). The data acquired by the illumination sensors (LS1F, LS1B) is stored in the memory module (STRG) by the sensing data storing control module (SDCNT), and also compared with each other by a front/back detection module (FBDET). When the name tags are worn on the respective persons, the illumination sensor (LS1F) mounted on the front surface receives an external light. On the contrary, the illumination sensor (LS1B) mounted on the back surface is sandwiched between a terminal main body and the wearer in a positional relationship, and therefore does not receive the external light. In this situation, the illuminance detected by the illumination sensor (LS1F) is larger than the illuminance detected by the illumination sensor (LS1B). On the other hand, when the terminal (TR) is turned over, the illumination sensor (LS1B) receives the external light, and the illumination sensor (LS1F) faces the wearer side. For that reason, the illuminance detected by the illumination sensor (LS1B) is larger than the illuminance detected by the illumination sensor (LS1F).

In this example, the illuminance detected by the illumination sensor (LS1F) and the illuminance detected by the illumination sensor (LS1B) is compared with each other by the front/back detection module (FBDET) to detect that the name tag node is reversed and incorrectly worn. When the reversal is detected by the front/back detection module (FBDET), a warning sound is generated from a speaker (SP) to notify the wearer of this fact.

The microphone (AD) acquires speech information. The wearer can know the surrounding environments such as "noisy" or "quiet" according to the speech information. Further, voice of the persons is acquired and analyzed to analyze the meeting communication as to whether the communication is active or sluggish, whether conversation is mutually evenly swung, or monopolized, whether the persons are angry or laughing, or the like. Further, a meeting state that cannot be detected by the infrared ray transmitters/receivers (AB) because of a location where the persons stand can be compensated by the speech information and the acceleration information.

Both of a speed waveform and a signal obtained by integrating the speed waveform by an integrating circuit (AVG) are acquired from the speed acquired by the microphone (AD). The integrated signal represents an energy of the acquired speed.

The triaxial acceleration sensor (AC) detects the acceleration of a node, that is, the motion of the node. For that reason, the triaxial acceleration sensor (AC) can analyze the intensity of the motion and the action such as walking of the person wearing the terminal (TR) on the basis of the acceleration data. Further, values of the acceleration detected by a plurality of terminals are compared with each other, to thereby analyze the degree of activity of the communication, mutual rhythms, and mutual correlation between the persons who wear those respective terminals.

In the terminals (TR) according to this embodiment, data acquired by the triaxial acceleration sensor (AC) is stored in the memory module (STRG) by the sensing data storing control module (SDCNT) while a direction of the name tag is detected by an up/down detection module (UDDET). This utilizes a fact that two kinds of a dynamic change in the acceleration due to the motion of the wearer and an static acceleration due to the gravity acceleration of the earth are observed from the acceleration detected by the triaxial acceleration sensor (AC).

A display apparatus (LCDD) displays individual information such as the affiliation and name of the wearer when the wearer wears the terminal (TR) on his breast. That is, the display apparatus (LCDD) functions as the name tag. On the other hand, when the wearer holds the terminal (TR) in his hand, and faces the display apparatus (LCDD) toward him, upper and lower portions of the terminal (TR) are reversed. In this situation, contents display on the display apparatus (LCDD) and the functions of buttons are switched to others according to an up/down detect signal (UDDETS) generated by the up/down detection module (UDDET). This embodiment illustrates an example in which the information displayed on the display apparatus (LCDD) is switched to analysis results obtained by an infrared ray activity analysis (ANA) generated by a display control (DISP) and a name-tag display (DNM) according to a value of the up/down detection signal (UDDETS).

The infrared ray transmitters/receivers (AB) exchange the infrared rays between the nodes, to thereby detect whether one terminal (TR) faces another terminal (TR), or not, that is, whether a person wearing one terminal (TR) meets a person wearing another terminal (TR), or not. For that reason, it is desirable that the terminal (TR) is worn on a front side of the person. As described above, the terminals (TR) further includes a sensor such as the triaxial acceleration sensor (AC). A process of sensing in the terminal (TR) corresponds to sensing (TRSS1) in FIG. 5.

In many cases, there are a large number of terminals, and when the terminals and the base station are connected to each other wirelessly, the respective terminals are connected to the base station (GW) to form the personal area network (PAN).

The temperature sensor (AE) of each terminal (TR) acquires a temperature at a certain location of the terminal, and the illumination sensor (LS1F) acquires luminance of the terminal (TR) in a front direction thereof. As a result, the surrounding environments can be recorded. For example, the terminal (TR) can know that the terminal (TR) travels from one location to another location on the basis of the temperature and the luminance.

An I/O device corresponding to the person wearing the terminal (TR) is provided with buttons 1 to 3 (BTN1 to 3), the display, apparatus (LCDD), and the speaker (SP).

The memory module (STRG) is specifically configured by a nonvolatile memory device such as a hard disc or a flash memory, and records the terminal information (TRMT) which is unique identification numbers of the terminals (TR), intervals of sensing, and motion set (TRMA) such as output contents to the display. In addition, the memory module (STRG) can temporarily record data, and is used for recording sensed data.

A clock (TRCK) holds time information (GWCSD), and updates the time information at regular intervals. In order to prevent the time information (GWCSD) from getting out of that of the other terminals (TR), the time is periodically corrected by the time information (GWCSD) transmitted from the base station (GW).

The sensing data storing control module (SDCNT) controls the sensing intervals of the respective sensors according to the motion set (TRMA recorded in the memory module (STRG), and controls the acquired data.

The time synchronize acquires the time information from the base station (GW), and corrects the time. The time synchronize may be executed immediately after the associate which will be described later, or may be executed according to a time synchronize command transmitted from the base station (GW).

When transmitting and receiving data, the communication control module (TRCC) conducts the control of transmission intervals, and the conversion into a data format corresponding to wireless transmission and reception. The communication control module (TRCC) may have a communication function by not wireless but wired connections as occasion demands. The communication control module (TRCC) may conduct the congestion control so that the transmission timing does not overlap with that of the other terminals (TR).

An associate (TRTA) transmits and receives an associate request (TRTAQ) and an associate response (TRTAR) for forming the personal area network (PAN) with respect to the base station (GW) to determine the base station (GW) to which data is to be transmitted. The associate (TRTA) is executed when a power source of the terminal (TR) turns on, and when the previous transmission and reception with respect to the base station (GW) are disconnected as a result that the terminals (TR) has traveled. In the case of the wired connection, the associate (TRTA) is executed when it is detected that the terminal (TR) is connected to the base station (GW) via wires. As a result of the associate (TRTA), the terminal (TR) is associated with one base station (GW) falling within a closer range where a radio signal from the terminal (TR) reaches.

The transmitting/receiving module (TRSR) includes an antenna to transmit and receive the radio signal. As occasion demands, the transmitting/receiving module (TRSR) can also transmit and receive the radio signal with the use of a connector for wired communication. Data (TRSRD) transmitted and received by the transmitting/receiving module (TRSR) is transferred to the base station (GW) through the personal area network (PAN).

Figure 5:
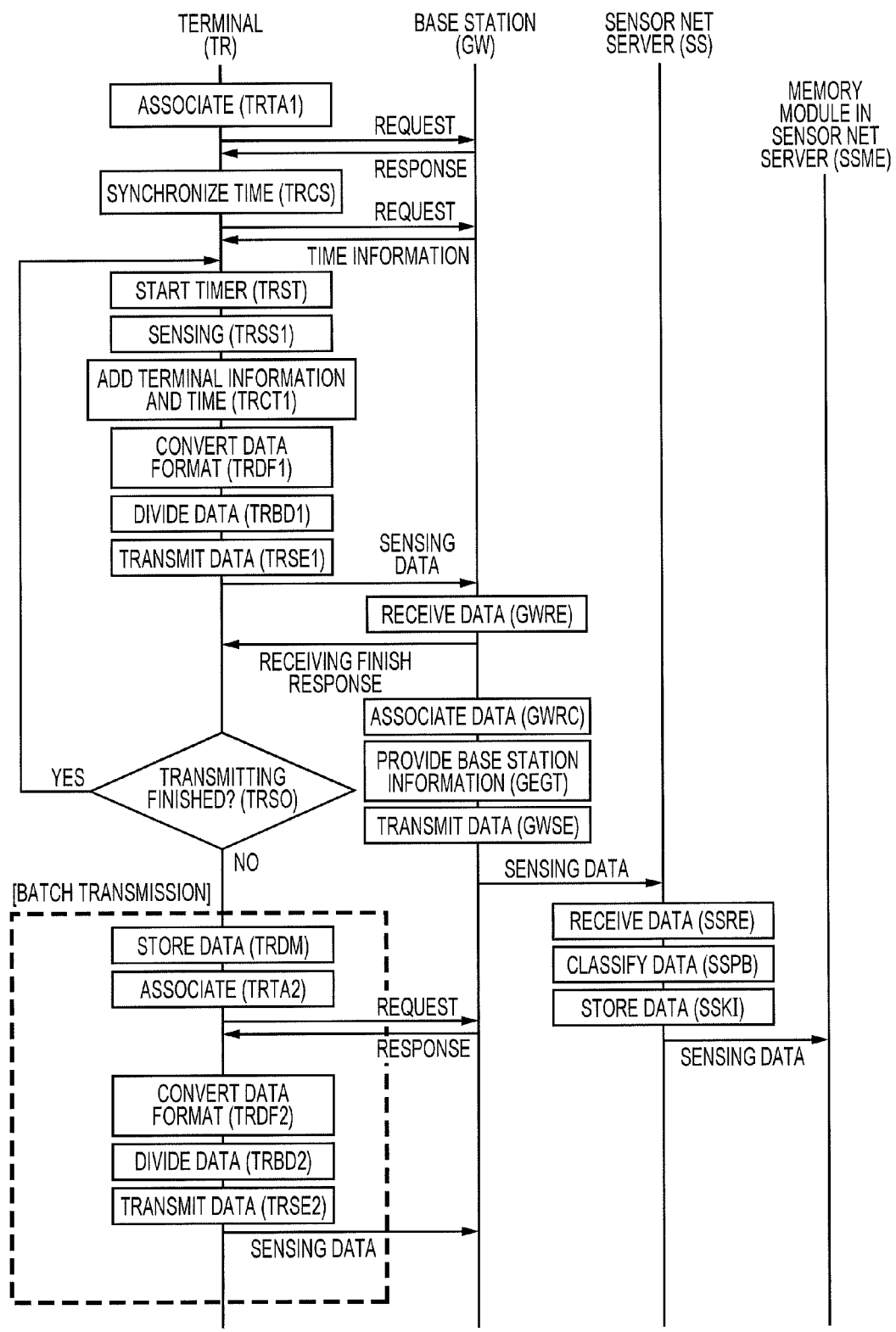
FIG. 5 is a sequence diagram illustrating an example of operation until sensing data is stored in the sensor net server.

<FIG. 5: Sequence of Data Storage>

FIG. 5 is a sequence diagram illustrating a procedure of storing the sensing data, which is executed by the embodiment of the present invention.

First, when the power supply of the terminal (TR) is on, and the terminal (TR) is not associated with the base station (GW), the terminal (TR) conducts associate (TRTA1). The associate specifies that the terminal (TR) has a relation to communicate with one certain base station (GW). Destination of data is determined by the associate so that the terminal (TR) can surely transmit data.

If the terminal (TR) receives the associate response from the base station (GW), and the associate succeeds, the terminal (TR) then conducts time synchronize (TRCS). In the time synchronize (TRCS), the terminals (TR) receives the time information from the base station (GW), and sets the clock (TRCK) within the terminal (TR). The base station (GW) is periodically connected to the NTP server (TS) to correct the time. For that reason, the time is synchronized in all of the terminals (TR). As a result, the time information associated with the sensing data is checked in analyzing later so that the exchange of mutual bodily expression or speech information in the communication between the persons at that time can be analyzed.

A variety of sensors such as the triaxial acceleration sensor (AC) and the temperature sensor (AE) in the terminals (TR) start a timer (TRST) with a given period, for example, every 10 seconds, and sense the acceleration, speed, temperature, and luminance (TRSS1). Each of the terminals (TR) transmits and receives the terminal ID which is one of the terminal information (TRMT) with respect to the other terminals (TR) by infrared rays to detect the meeting state. The variety of sensors in the terminals (TR) may always sense those surrounding environments without starting the timer (TRST). However, the power source can be efficiently used by starting the sensors with the given period, and the terminals (TR) can continue to be used without being charged for a long time.

Each of the terminals (TR) adds the time information on the clock (TRCK) and the terminal information (TRMT) to the sensed data (TRCT1). In analyzing data, the persons wearing the terminals (TR) are identified by the terminal information (TRMT).

In data format conversion (TRDF1), the terminal (TR) allocate the tag information such as the conditions of sensing to the sensing data, and converts the sensing data to a given radio transmission format. The format is saved in common with the data format information (GWMF) within the base station (GW) and the data format information (SSMF) within the sensor net server (SS). The converted data is thereafter transmitted to the base station (GW).

When a large amount of sequential data such as the acceleration data or the speed data is transmitted, the terminal (TR) divides the data (TRBD1) into a plurality of packets to limit the amount of data to be transmitted at a time. As a result, a risk that data is made defective during a transmitting process is reduced.

Data transmission (TRSE1) transmits the data to the base station (GW) of an associate destination through the transmitting/receiving module (TRSR) according to the wireless communication standards.

Upon receiving the data from the terminal (TR) (GWRE), the base station (GW) returns a receiving finish response to the terminal (TR). The terminal (TR) that has received the response determines that transmitting has been finished (TRSO).

If the transmitting has not yet been finished (TRSO) even if a given time elapses (that is, the terminal (TR) does not receive the response), the terminal (TR) determines that the data transmission is in failure. In this case, the data is stored within the terminal (TR), and batch transmitted again when a transmission state is established. As a result, if the person who wears the terminal (TR) travels to a location where radio does not reach, or even if data is not received due to trouble of the base station (GW), the data can be acquired without losing the data. As a result, the sufficient amount of data can be obtained to analyze the property of the organization. A mechanism of saving data failing to be transmitted in the terminal (TR) and retransmitting the data is called "batch transmission".

A procedure of data batch transmission will be described. The terminal (TR) stores the data that could not be transmitted (TRDM), and again makes a request for associate after a given time (TRTA2). In this situation, if an associate response is obtained from the base station (GW), the terminal (TR) executes data format conversion (TRDF2), data division (TRBD2), and data transmission (TRSE2). Those processing is identical with the data format conversion (TRDF1), the data division (TRBD1), and the data transmission (TRSE1). In the data transmission (TRSE2), a convergence control is conducted to avoid radio collision. Subsequently, the operation returns to the normal processing.

If the associate response is not obtained, the terminal (TR) stores data newly acquired (TRDM) while executing the sensing (TRSS1) and the terminal information/time information addition (TRCT1) periodically until the associate succeeds. The data acquired by those processing is stored within the terminal (TR) until the receiving finish response is obtained from the base station (GW). The sensing data stored within the terminal (TR) is batch transmitted to the base station (GW) after the associate has succeeded, or when the environments where the terminal (TR) can stably transmit and receive data with respect to the base station such that the terminal (TR) is connected to the base station (GW) via wires (TRSE2).

Also, the sensing data transmitted from the terminal (TR) is received by the base station (GW) (GWRE). The base station (GW) determines whether the received data has been divided, or not, according to divided frame number associated with the sensing data. If the data has been divided, the base station (GW) executes data association (GWRC), and associates the divided data with successive data. Further, the base station (GW) allocates the base station information (GWMG) which is number unique to the base station to the sensing data (GWGT), and transmits the data toward the sensor net server (SS) through the network (NW) (GWSE). The base station information (GWMG) can be used in data analysis as information indicative of a rough position of the terminal at that time.

Upon receiving the data from the base station (GW) (SSRE), the sensor net server (SS) classifies the received data for each element of time, terminal information, acceleration, infrared rays, and temperature (SSPB). This classification is executed by referring to the format recorded as the data format information (SSMF). The classified data is stored in appropriate columns of a record (row) of the sensing database (SSDB). Data corresponding to the same time is stored in the same record to enable search by the time and the terminal information (TRMT). In this situation, as occasion demands, a table may be created for each terminal information (TRMT). Data reception (SSRE), data classification (SSPB), and data storage (SSKI) are conducted in the sensing data save (SSCDB) in FIG. 3.

Figure 6:
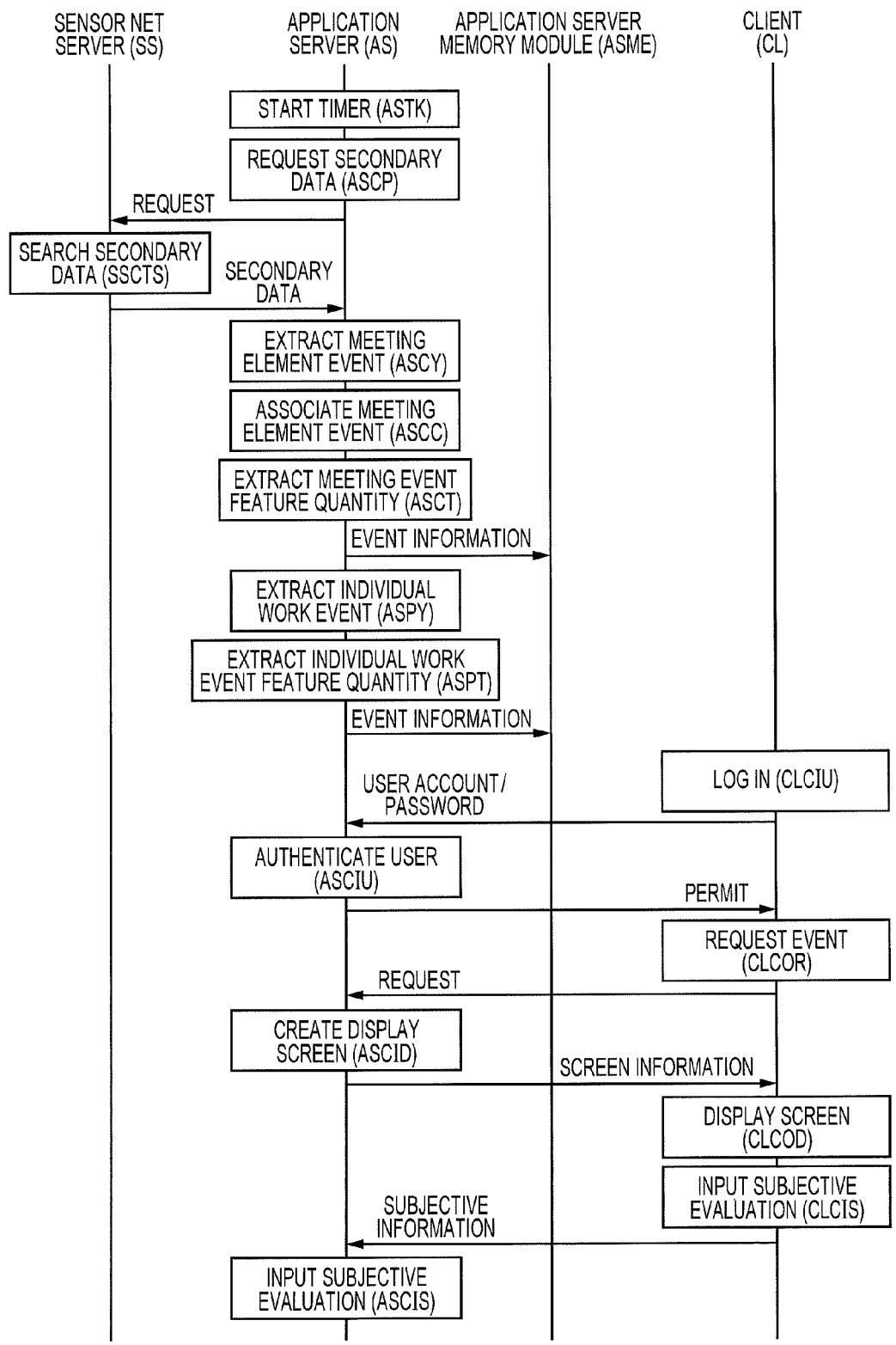
FIG. 6 is a sequence diagram illustrating an example of event extraction processing with the application server (AS) as an origin, and processing when a user operates a web application.

<FIG. 6: Sequence of Event Extraction and User Operation>

FIG. 6 illustrates a sequence diagram of event extraction processing with the application server (AS) as an origin, and processing when the user operates a web application.

First, in the event extraction processing, the program timer-starts (ASTK) at a given time in the application server (AS), and the necessary secondary data is requested from the sensor net server (SS) with designation of the subject user and period (ASCP). The sensor net server (SS) searches the secondary database (SSDT) on the basis of the request (SSCTS), and returns the secondary data. The application server (AS) processes the received secondary data to conduct the meeting element event extraction processing (ASCY), the meeting element event associate processing (ASCC), and the meeting element event extraction processing (ASCT), and stores the event information related to the meeting events (event IDs, start times, end times, member IDs, and feature quantities of the respective members) in the memory module (ASME) as the meeting event table (ASCE). Also, the application server (AS) conducts individual work event extraction processing (ASPY) and individual work event feature quantity extraction processing (ASPT), and stores event information related to the individual work events (event IDs, member IDs, low event IDs, and start times, end times, and feature quantities of the respective low events) in the memory module (ASME) as the individual work event table (ASPE).

Also, a process when the user browses data with the use of the web application will be described. The user (US) operates the client (CL), and first accesses to a designated web site to log in (CLCIU). The application server (AS) checks a received use account against password to conduct user authentication (ASCIU), and gives the client (CL) browse/operation permission. The user (US) browses, for example, a screen illustrated in FIG. 7 on the display (CLOD) of the client (CL), and operates buttons in a display switching area (ODSI) and a date switching area (ODSD) to transmit a request for data or event to be watched (CLCOR). The user creates a display screen in the application server (AS) according to the request (ASCID), and displays the display screen on the display (OD) of the client (CL) (CLCOD). When the user (US) inputs subjective evaluation information, the user (US) presses, for example, a user operation module (ODEI_CC, ODEI_PC) in FIGS. 8 and 9 to open an input screen, and can input the subjective information in association with the event by numerical numbers or character strings (CLCIS). The input subjective information is stored in the subjective information table (ASST) of the application server (AS) (ASCIS).

<FIG. 7: Example of Display Screen>

FIG. 7 illustrates an example of the display (OD) output in an output device such as the display (CLOD) of the client (CL).

A title area (ODST) is used to switch the type of page to be displayed to another, and to confirm the name of the user (US) which currently logs in.

When page related to "event" is opened, events for one day are arrayed in time series and displayed in an event display field (ODEI). In this example, all of the events for a plurality of members which are different in the type are sorted by a time stamp.

The date switching area (ODSD) is a field for switching date of data displayed in the event display field (ODEI) to another.

The display switching area (ODSI) is an area for switching the type and group of the events to be displayed in the event display field (ODEI) to another. Checks of check boxes turn on/off to enable a request for display to be transmitted to the application server (AS) (CLCOR). In the selection of the groups, if "refine members" is selected as a refining method, all of the events including the members belonging to the ticked group are displayed. Also, if "refine groups" is selected, only the event when the group is defined to a group name of each event is displayed. Which group the event is defined to is manually conducted by the user (US). Alternatively, the group may be automatically defined for convenience according to a match rate of the meeting members.

Figure 8:
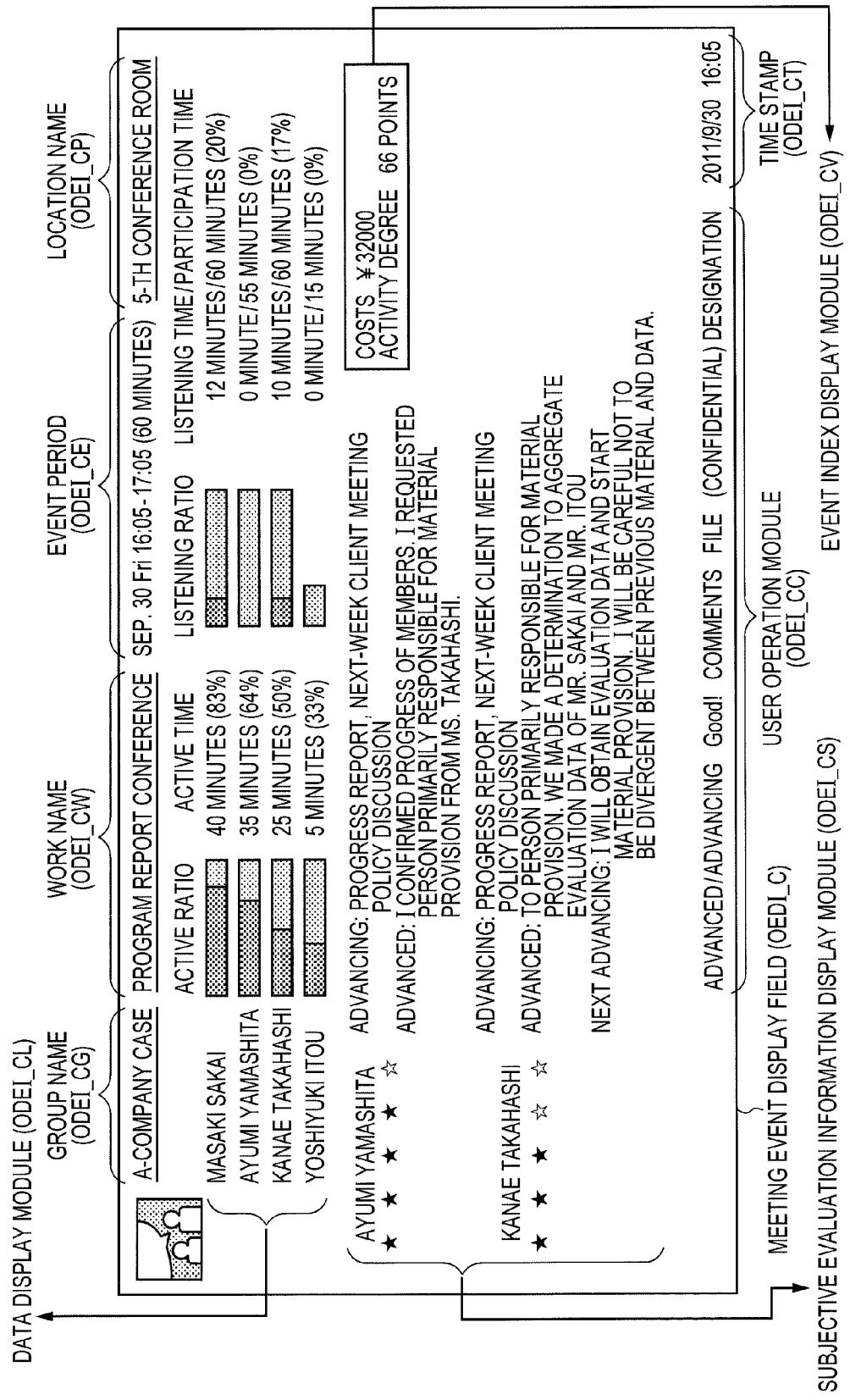
FIG. 8 is a diagram illustrating an example of a display screen of a meeting event.

<FIG. 8: Example of Display Screen (Meeting Event Field)

FIG. 8 illustrates an example of enlarging one of meeting event display fields (ODEI_C) displayed in the event display field (ODEI).

Data of a data display module (ODEI_CD), an event period (ODEI_CE), and an event index display module (ODEI_CV) is automatically calculated according to the processing results of the sensing data, and displayed. Also, when a location can be specified by the location beacon (PB), a location name (ODEI_CP) is also automatically displayed. A group name (ODEI_CG) and a business name (ODEI_CW) are blank in an initial state, but filled with input by the user (US) per se. An option is displayed from registered group names so that an input load of the user (US) can be reduced.

In the data display module (ODEI_CD), a participation time, a listening time, and an active time are shown for members who participate in the meeting event, and their ratios (active ratio and listening ratio) are shown as a graph. The alignment sequence of the members can be sorted in the shorter order of the participation time or in the lower order of the active ratio.

In the event index display module (ODEI_CV), rough costs are calculated by multiplying the total number of hours required for the event by a cost calculation criterion set in a data processing variable list (ASDV). Also, the degree of activation is calculated with provision of a calculating formula such that the active ratio and the listening ratio are weighted, and for example, the degree of activation is higher as the active ratio is higher, and higher as the listening ratio is lower. The calculating formula of the degree of activation is determined in conformity with how to communicate which is ideal in the organization. For example, the degree of activation may be set to be higher as the time is shorter and as a variation of the active ratio is smaller.

A user operation module (ODEI_CC) includes a button operated by the user for adding information to this event. "Advancing/advanced" is configured so that the participant of the event records subjective evaluation information such as the contents or impression of the event as conference minutes. Records written by the subject participant and other participants are arrayed and displayed on a subjective evaluation information display module (ODEI_CS). A button "Good!" can be pressed by any visitors in order to transmit a positive opinion although a comment does not need to be left. "Comments" are provided so that the visitors transmit comments related to the event. "File" is configured to upload a document (for example, conference minutes or handouts) related to the event. When "(confidential designated)" is designated, the event is not displayed to persons other than the participants of the event.

The subjective evaluation information display module (ODEI_CS) is a location where the subjective information of various persons, which has been input from a user operation module (ODEI_CC), is listed and displayed.

A time stamp (ODEI_CT) is a time that is a criterion for rearraying the events in time series in time series within the event display field (ODEI). In the case of the meeting event, the start time may be set to the time stamp (ODEI_CT). As described above, the events that have really happened are automatically cut out by the sensor data, and the subjective information such as happenings or impressions of the plural related persons is aggregated in association with those cut-out events. This makes it easy that the related persons share a status of daily business with each other. Because the status also includes qualitative indexes such as the active ratio during conversation, there is advantageous in that the status is easily imaged. Thus, the subjective information is recorded with small effort. As a result, even if there is no chance where the person has a frequent conversation with a boss or teammates because of a distant office or a cross-sectional project, they can share the respective business statuses with each other, and help early detection of a problem and the optimum distribution of business.

Figure 9:
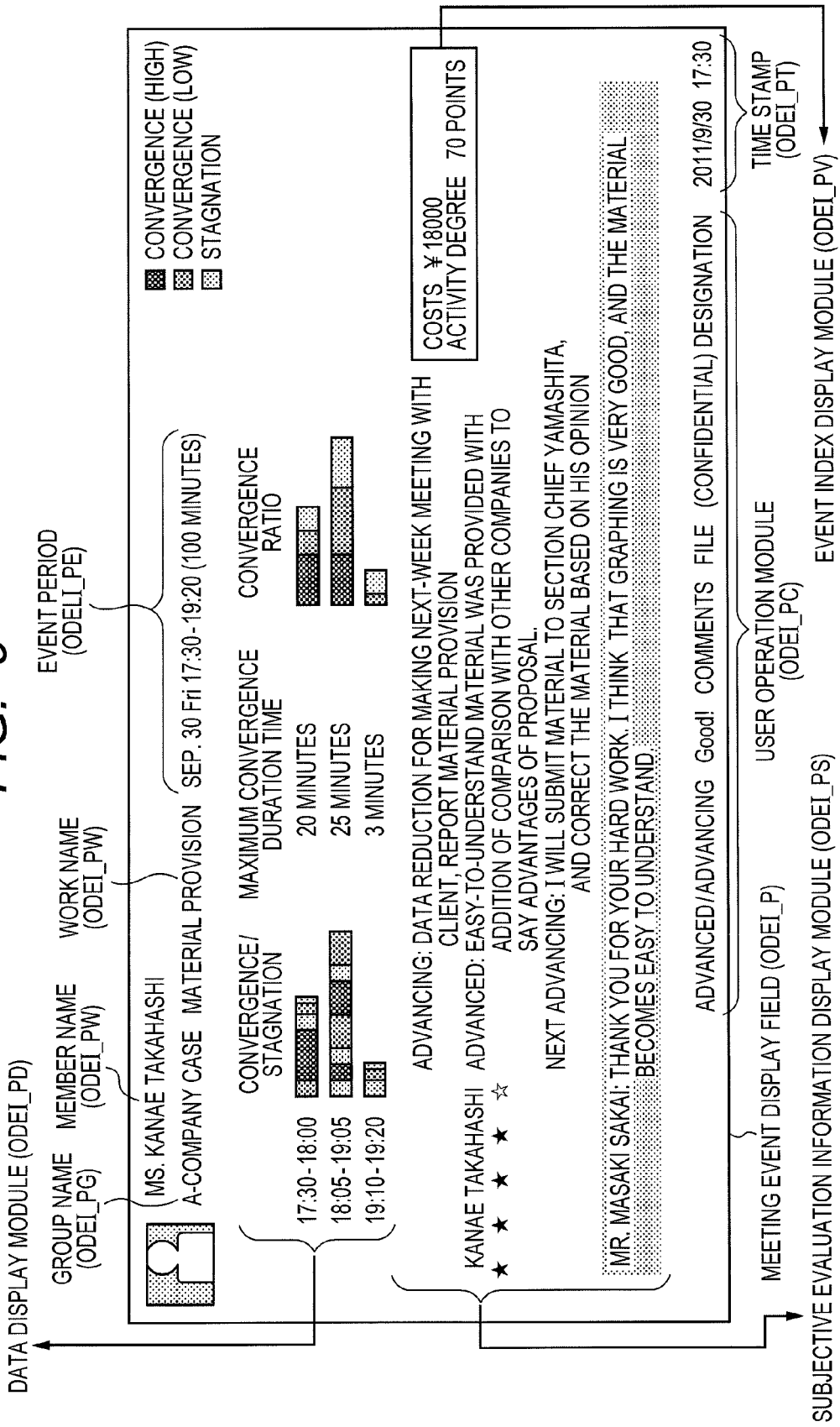
FIG. 9 is a diagram illustrating an example of a display screen of an individual work event.

<FIG. 9: Example of Display Screen (Meeting Event Field)

FIG. 9 illustrates an example of enlarging one of individual work event display fields (ODEI_P) displayed in the event display field (ODEI).

The tasks of the respective sites are substantially common to those in the meeting event display field in FIG. 8. A data display module (ODEI_PD) corresponds to (ODEI_CD), a group name (ODEI_PG) corresponds to (ODEI_CG), a business name (ODEI_PW) corresponds to (ODEI_CW), an event period (ODEI_PE) corresponds to (ODEI_CE), a user operation module (ODEI_PC) corresponds to (ODEI_CC), a time stamp (ODEI_PT) corresponds to (ODEI_CT), a subjective evaluation information display module (ODEI_PS) corresponds to (ODEI_CS), and an event index display module (ODEI_PV) corresponds to (ODEI_CV).

A member name (ODEI_PW) is the name of an interested party who conducts the individual work event.

Also, in the data display module (ODEI_PD), a plurality of individual work events (called "low events" in FIG. 15) is arrayed, and may be dealt with as one individual work event within the event display field (ODEI). This is because the individual work continues generally for only about 30 minutes to 90 minutes, and a plurality of events happens per day, but to write evaluations for the respective events falls to user's share. For that reason, the events may be bound into morning, afternoon, and night, and batched. Also, the alignment sequence of the individual events within the data display module (ODEI_PD) may be opposite to the alignment sequence of the event display fields (ODEI). For example, when the event display fields (ODEI) are arranged in descending order, the interior of the data display module (ODEI_PD) may be arranged in ascending order. Also, in the individual work event display fields (ODEI_P), the degree of convergence is indicated by three levels as breakdown of the respective individual work events as data. The degree of convergence is determined according to the motion of the body. For example, "stagnation" is a case in which the acceleration rhythm is equal to or lower than a given value, and the other state is set as "convergence". A case in which "convergence" is continued for a long time is set as "convergence (high)", and the other case can be distinguished as "convergence (low)".

Also, the degree of convergence of the event index display module (ODEI_PV) can be calculated by weighting "convergence (high)" and calculating the degree of convergence.

<FIG. 10: Example of User ID Correspondence Table (ASUL)>

FIG. 10 is an example of a format of the user ID correspondence table (ASUL), which is saved within the memory module (ASME) in the application server (AS). In the user ID correspondence table (ASUL) are recorded a user number (ASUIT1), a user name (ASUIT2), a terminal ID (ASUIT3), and a department (ASUIT4) and a section (ASUIT5) to which the user belongs in association with each other. The user number (ASUIT1) represents serial No. of the existing user. Also, the user name (ASUIT2) is a notation of the name or nickname of the user (US) used when creating the display screen or the content, and the terminal ID (ASUIT3) represents terminal information of the terminal (TR) possessed by the user (US). The users (US) and the terminal ID (ASUIT3) basically correspond to each other on a one to one basis. Also, the department (ASUIT4) and the section (ASUIT5) to which the person belongs are information on the organization to which the user (US) belongs. For example, when the base content is created on an organization unit, the members included in the data are specified on the basis of this information.

In FIG. 10, the information on the user and the organization to which the user belongs specified in the form of a table. However, the information may be hierarchically represented by using XML. In this case, the information can be notated in conformity with an organizational hierarchy such that A department exists under A company, and A1 section exists under the A department. The user names of the individuals and the terminal IDs can be written in an appropriate organization. Because the same person can really belong to a plurality of organizations, the plurality of organizations may correspond to one user.

<FIG. 12: Example of Sensing Database (SSDB): Acceleration Data Table>

FIG. 12 illustrates an example (SSDB_ACC_1002) of an acceleration data table as an example of the sensing data stored in the sensing database (SSDB) within the sensor net server (SS). This is basically the sensing data per se which is acquired by the terminal (TR), that is, data that is not subjected to preprocessing. A table is created for each individual, and respective acceleration data in the triaxial directions of an X-axis (DBAX), a Y-axis (DBAY), and a Z-axis (DBAZ) are stored in association with time information (DBTM) in a sampling cycle (for example, 0.02 seconds). An actual numerical number detected by the acceleration sensor may be stored, or a value whose unit has been converted into a gravitational constant [G] may be stored. Such an acceleration data table is created for each of the members, and stored in correspondence with information on the time at which the sensing is conducted. With addition of a column indicative of the user IDs, the tables may be merged without being separated for each of the individuals.

<FIG. 13: Example of Sensing Database (SSDB): Meeting Table>

Plural types of sensing data for the plurality of members is recorded in the sensing database (SSDB), and among those sensing data, examples of a table in which the meeting data by the infrared ray transmission and reception is organized are illustrated in FIGS. 13A and 13B. FIG. 13A is a meeting table (SSDB_IR_1002) which assumes a table in which data acquired by the terminal (TR) whose terminal ID is 1002 is organized. Likewise, FIG. 13B is a meeting table (SSDB_IR_1003) which assumes a table in which data acquired by the terminal (TR) whose terminal ID is 1003 is organized. With the addition of the infrared ray receiving side ID to the column, the table may not be separated for each of the acquired terminals (TR). Also, data on the other acceleration or temperature may be included in the same table. Also, the detector ID (CLVDID) received from the location beacon (PB) is entered to an infrared ray transmitting side ID (DBR) from the terminal (TR) as with the received user ID. In this case, the table is searched with the detection ID as a key, thereby making it possible to check who stays in any location, or determine that the persons who stay in the same location at the same time meet each other, and can compensate a case in which the infrared rays could not been transmitted or received between the terminals (TR) from the viewpoints of problems on the angle or the distance.

FIGS. 13A and 13B are examples in which the meeting tables store 10 sets (DBR1 to DBR10, DBN1 to DBN10) of the time (DBTM) at which the terminals (TR) transmit data, an infrared ray transmitting side ID1 (DBR1), and the number of receiving times (DBN1) from the ID. When data is transmitted once for 10 seconds, how many time the infrared rays are received from any terminal (TR) for 10 seconds after the previous transmission is expressed by those tables. Also, when one terminal (TR) meets the plurality of terminals (TR) for 10 seconds, up to 10 sets can be stored. The number of sets can be freely set. If there is no meeting, that is, the infrared rays are not received, a value of the table becomes null. Also, in FIGS. 13A and 13B, the time is notated up to milliseconds. However, any time formats can be applied if the time format is unified.

<FIG. 14: Facing Event Table (ASCE)>

FIG. 14 illustrates an example of the format of the meeting event table (ASCE). The meeting event table (ASCE) is a table that stores information on the meeting event, which is extracted from the results of a sequence of the processing of the meeting element event extraction processing (ASCY), the meeting element event associate processing (ASCC), and the meeting element event extraction processing (ASCT). The meeting event table (ASCE) has an ID allocated to each of the events, and includes information on the start time, the end time, ID of the participant member, and information on the feature quantities (for example, participation time, active time, listening time, etc.) in the event of each member. The meeting event display fields (ODEI_C) are created on the basis of those information.

<FIG. 15: Individual Work Event Table (ASPE)>

FIG. 15 illustrates an example of the format of the individual work event table (ASPE). The individual work event table (ASPE) is a table that stores information on the individual work event, which is extracted from the results of a sequence of the processing of the individual work event extraction processing (ASPY), and the individual work event feature quantity extraction processing (ASPT). The individual work event table (ASPE) has an ID allocated to each of the events, and includes the information on the start time, the end time, ID of the members, and information on the feature quantities (for example, maximum convergence duration time, the convergence (high), the convergence (low), the time of stagnation, etc.) in the event of each member. The individual work event display fields (ODEI_P) are created on the basis of those information. When a method of batching a plurality of individual work events for each of morning, afternoon, and night for display is applied, it is possible that the IDs of the low events are allocated to the respective events having the same members at the same time zone, additional event IDs are allocated to the batched events and controlled.

<FIG. 16: Subjective Information Table (ASST)>

FIG. 16 illustrates an example of the format of the subjective information table (ASST). The subjective evaluation information (information such as advancing/advanced, comments, or Good!) and classification (group classification, business classification), (confidential) designation, and a link to an attachment file, which are input by the use in association with the events according to subjective evaluation inputs (CLCIS, ASCIS) are stored. When the information is displayed in the event display field (ODEI), the information is linked to the information on the meeting event table (ASCE) and the individual work event table (ASPE) based on the sensor data for display.

<FIG. 17: Data Processing Variable Screen (ODDV)>

FIG. 17 illustrates an example of the data processing variable screen (ODDV) which is a set screen of a variable used in processing which is executed in the control module (ASCO) within the application server (AS). The set data is stored in the data processing variable list (ASDV), and is referred to in executing the processing. Only persons having the authority of a system manager can change setting of the data processing variable screen (ODDV).

<FIG. 31: Example of Secondary Database (SSDT): Motion Rhythm Tapestry>

FIG. 31 illustrates an example of a motion rhythm tapestry (SSDB_ACCTP_1min) as an example of the secondary database (SSDT). The motion rhythm tapestry (SSDB_ACCTP_1min) calculates a frequency (called "motion rhythm") of each user (US) at regular time intervals (every one minute in an example of FIG. 31) on the basis of an acceleration data table (SSDB_ACC), and stores the time for each one minute and the user IDs in association with each other in the table. The format of storing data may be configured by another fashion such as a CSV file aside from the tables. In calculating the motion rhythm, the number of zero cross times in the triaxis of X, Y, and Z for each time unit may be summed up to obtain the motion rhythm. Also, when it is determined that data is defective or improper, symbol such as "Null" is filled and indicates that the data is not used when creating the basic content (ASCBC). Also, when several kinds of motion rhythm tapestries (SSDB_ACCTP) different in time unit are created in the sensor net server (SS) in advance, a variety of contents can be created by the combination of those motion rhythm tapestries, which is useful.

<FIG. 32: Example of Secondary Database (SSDT): Meeting Tapestry>

FIG. 32 illustrates an example of a meeting tapestry (SSDB_IRTP_1min) as an example of the secondary database (SSDT). The meeting tapestry (SSDB_IRTP_1min) is marshaled to show the ID of a meeting partner who meets each user (US) at regular time intervals (for each one minute in an example of FIG. 32) on the basis of a meeting table (SSDB_IR). For example, there is a case in which an ID of a person A which is communicated by infrared rays is received by a terminal (TR) of a person B whereas an ID of the person B is not received by a terminal (TR) of the person A, for the reason of the orientation of the bodies. Data that corrects such a basic unconformity is stored in the secondary database (SSDT) as the secondary data.

Thus, when the sensor net server (SS) conducts the preprocessing through the sensing data processing (SSCDT), when developing a program (ASSP, etc.) for creating the content by the application server (AS) can be developed without regard to the characteristics of the sensing data and the preprocessing method.

Figure 18:
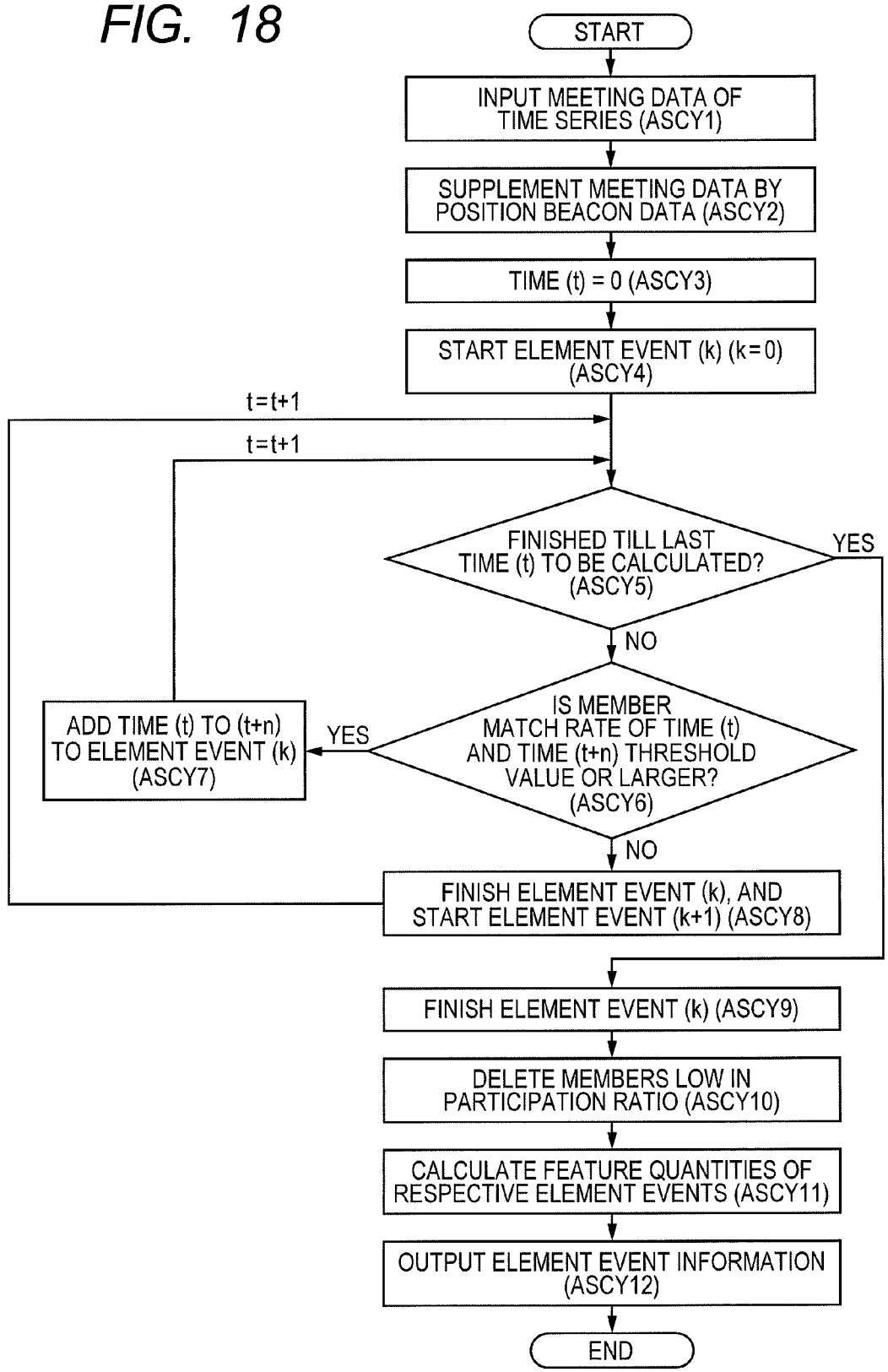
FIG. 18 is a flowchart of meeting element event extraction processing.

<FIG. 18: Flowchart of Meeting Element Event Extraction Processing (ASCY)>

FIG. 18 illustrates a flowchart of a processing procedure of the meeting element event extraction processing (ASCY). The meeting element event extraction processing (ASCY) is a process of extracting a status in which the persons gather together face-to-face (called "meeting event") in the present invention) by mainly using the meeting data representing that the persons meet each other due to the infrared ray transmission and reception between the terminals (TR), and specifies the start time, the end time, and participant members. The meeting element event extraction processing (ASCY) pays attention to one person, and extracts a meeting element event (meeting event extracted on the basis of one person is called "meeting element event" in the present specification) from group members who meet each other at the same time. For that reason, a plurality of meeting element events is extracted from the viewpoints of the plural persons. Because those meeting element events may represent the same meeting event, the similar meeting element events are found and associated with each other through the meeting element event associate processing (ASCC) to minimize the number of meeting events.

Through those two processes, ambiguous meeting event in which the persons gather together and dissolve ad hoc can be extracted. This leads to advantages that the sequential meeting event of another member group can be identified, that the meeting partner in a short time is not included in the participant members (because an participation time ratio is included in the member determination criterion), and that persons who participate in the meeting event late on the way, or persons who leave the meeting event on the way are also included in the participant members.

A processing procedure of the meeting element event extraction processing (ASCY) will be described together with a specific example of FIG. 20 with reference to FIG. 18.

First, in the secondary data request (ASCP), the time-series meeting data is read (ASCY 1). This is the meeting tapestry (SSDB_IRTP_1min) illustrated in FIG. 32, and a time unit may be freely set, for example, to 1 minute or 10 minutes, on the basis of granularity with which the event is to be cut out. Also, as occasion demands, meeting data supplement (ASCY 2) is conducted by the location beacon. This is supplement processing which considers the persons detected at the same time to directly meet each other through the location beacon (PB) placed on a conference table because each participant cannot frequently allow transmission to all of the participants among the terminals (TR) at a gathering in a large conference room. If the supplement processing is unnecessary, ASCY 2 may be skipped.

Then, a time (t) is set to 0 (ASCY 3), the element event (k) is set to k=0, and the processing starts (ASCY 4). FIG. 20 illustrates a determining process of the meeting element event which is conducted by incrementing the time t 1 by 1 in an example in which a meeting partner of a specific person (Mr. A) is output at 1-minute intervals from the meeting tapestry (SSDB_IRTP_1min). The determination is based on whether a match rate of the members at the time (t) and a time (t+n) is equal to or larger than a threshold value, or not (ASCY 6). In this example, n is a window time width set in FIG. 17, and n=4 is met in an example of FIG. 20. Referring to FIG. 20, on a row of t=03, the member match rates at t=03 and t=07 (=03+4) are compared with each other, and the match rate is 67%. Because 67% of the match rate is higher than 50% of the threshold value (th_m1) set in the data processing variable screen (ODDV) of FIG. 17, it is determined that the event is being conducted for five minutes from t=03 to t=07, and an event flag (ComEvent_A1) is set to 1 (ASCY 7). The member match rate is calculated by {(the number of members present at both of the time (t) and the time (t+n))/(the number of members present at at least one of the time (t) and the time (t+n))}. The determination of (ASCY 6) is repeated by incrementing t one by one, and when the member match rate becomes equal to or smaller than the threshold value (when t=10 is met in the example of FIG. 20), the element event (ComEvent_A1) is finished, and a subsequent event (ComEvent_A2) starts (ASCY8). In FIG. 20, the meeting element event (ComEvent_A2) is conducted between t=13 and t=18. The group members of (ComEvent_A1) are four persons of Mr. A, Mr. B, Mr. D, and Mr. E, and the group members of (ComEvent_A2) are two persons of Mr. A and Mr. C. As a result, it is found that another meeting event different in the group members is appropriately distinguished. Also, in the meeting element event (ComEvent_A1), both of the start times and the end times of meeting of Mr. A, Mr. B, and Mr. D are not the same. However, because there are a large number of common portions, the meeting element event (ComEvent_A1) are flexibly extracted as the same event. Additionally, because the members low in the time rate of participant in the meeting element event are deleted (ASCY10), Mr. E who has participated for only two minutes is omitted from the participant members of the meeting element event (ComEvent_A1).

Thus, the separation of the meeting element events and the participant members are extracted while shifting the time. Then, after the extraction has been finished up to the last time (t) to be calculated (ASCY5), the element event (k) finally counted is finished. The members low in the participation ratio in the respective element events extracted up to then are deleted (ASCY10), and the feature quantities are then calculated (ASCY11). An example of extracting the feature quantities is illustrated in FIG. 21. The motion rhythm tapestry (SSDB_ACCTP_1min) of the participant members during an event time is picked up (FIG. 21A). A time during which the motion rhythm tapestry (SSDB_ACCTP_1min) is equal to or larger than an active determination threshold value (th_act) of the data processing variable screen (ODDV) is set as active. A time during which the motion rhythm tapestry (SSDB_ACCTP_1min) is smaller than an active determination threshold value (th_act) continues for a given time (th_1st, five minutes in the figure), a number thereof is counted as the listening time. An example of the results is illustrated in FIG. 21B. The feature quantity represents the activity characteristics of the respective participant members during the meeting event. When the person positively works on the partner to have communication with each other (speaking or nodding), since the body moves, the degree of positivity of communication is reflected to the acceleration rhythm. As a result, the characteristics of the communication can be evaluated from the acceleration rhythm. Also, the listening time is to evaluate a time when a passive listener continues to listen for a long time. It is empirically found that the quality of communication cannot be frequently controlled by his will, for example, in a time during which the person listens to presentation.

Information (start time, end time, participant member, and the feature quantities of the respective participant members) on the element event obtained in the manner described above is output to the memory module (ASME) (ASCY11), and the meeting element event extraction processing (ASCY) is finished.

Figure 19:
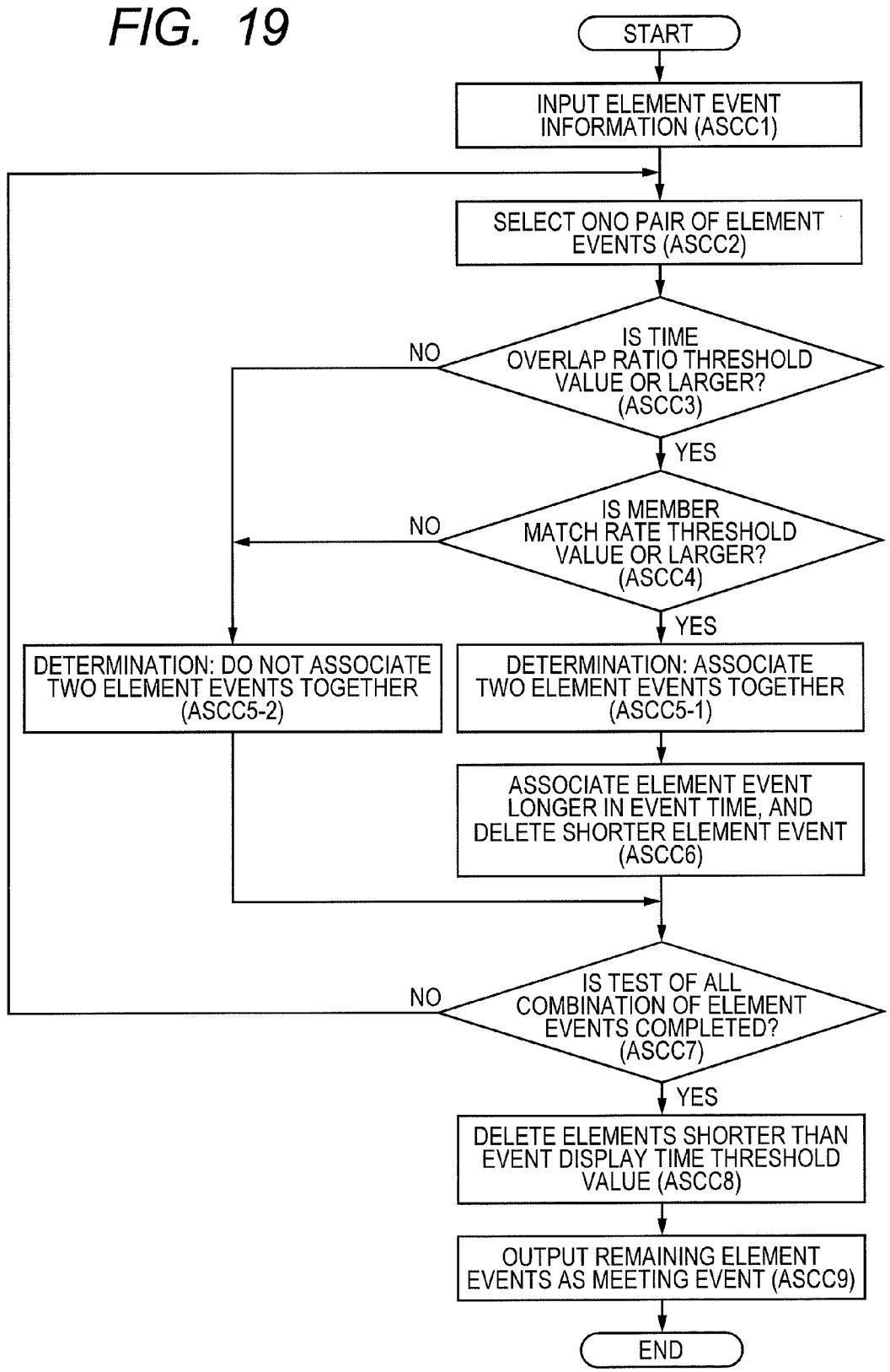
FIG. 19 is a flowchart of meeting element event associate processing.

<FIG. 19: Flowchart of Meeting Element Event Associate Processing (ASCC)>

The processing procedure of meeting element event associate processing (ASCC) will be described together with a specific example of FIGS. 22A and 22B with reference to FIG. 19.

All of information on the element events extracted in the meeting element event extraction processing (ASCY) is input (ASCC 1), a pair of element events is selected (ASCC 2), and it is determined whether those element events are to be regarded as the same event, or not. There are two determination criteria of whether a time overlap rate of the two meeting element events is equal to or larger than a threshold value (th_c2), and whether the member match rate is equal to or larger than a threshold value (th_c1). The time match rate is calculated by {(a time during which the meeting element event (1) and the meeting element event (2) overlap with each other)/(a longer time of the meeting element event (1) and the meeting element event (2))}. The member match rate is calculated by {(the number of members present in both of the meeting element event (1) and the meeting element event (2))/(the number of members present in at least one of the meeting element event (1) and the meeting element event (2))}. If both of those conditions are met, it is determined that those two element events are associated (ASCC 5-1), the element event shorter in the event time is associated with the longer element event, and the shorter element event is deleted (ASCC 6). If any condition is not met, it is determined that the two element events are independent from each other, and not associated with each other (ASCC 5-2). The procedure is completed after all combinations of the element events have been tested (ASCC 7).

FIGS. 22A and 22B illustrate examples of a plurality of meeting element events, in which FIG. 22A illustrates a time when the respective meeting element events occur, and FIG. 22B illustrates a time during which the participant members and the events continue. In this case, the element events higher in the ratios of the overlap time and the common members are associated with each other, and the longest event remains. As a result, events [C01], [C03], and [C07] finally remain as independent meeting events. Thereafter, because the events shorter than an event display time threshold value (th_d) are deleted (ASCY8), the event [C07] is also deleted. IDs are allocated to the remaining element events [C01] and [C03] as the meeting event, and stored in the meeting event table (ASCE) together with the feature quantities thereof.

When two element events are associated with each other, a method in which one element event remains, and the other element event is deleted is not applied, but a time between an earlier start time and a later end time may be redefined as one new event. Also, the activity index of the participant members within each event which is the feature quantity may be again calculated after the event associate has been finished, and stored in the meeting event table (ASCE).

Through the above procedure, the shorter events are absorbed or deleted, and only the events having a certain length remain. This leads to such an advantage that the events are easily associated with the memory of the user (US) per se, and the subjective evaluation information is easily written. If the individual events are too short, the subjective evaluations cannot be input to all of the events. On the other hand, if the events are too long, the subjective evaluation of another type must be written for one event. Therefore, the setting of the window time width (n) and the threshold values (th_m1, th_m2, th_c1, th_c2, th_d) may be preferably adjusted so that the events are separated with a length easy to write (for example, from 15 minutes to 3 hours).

Figure 23:
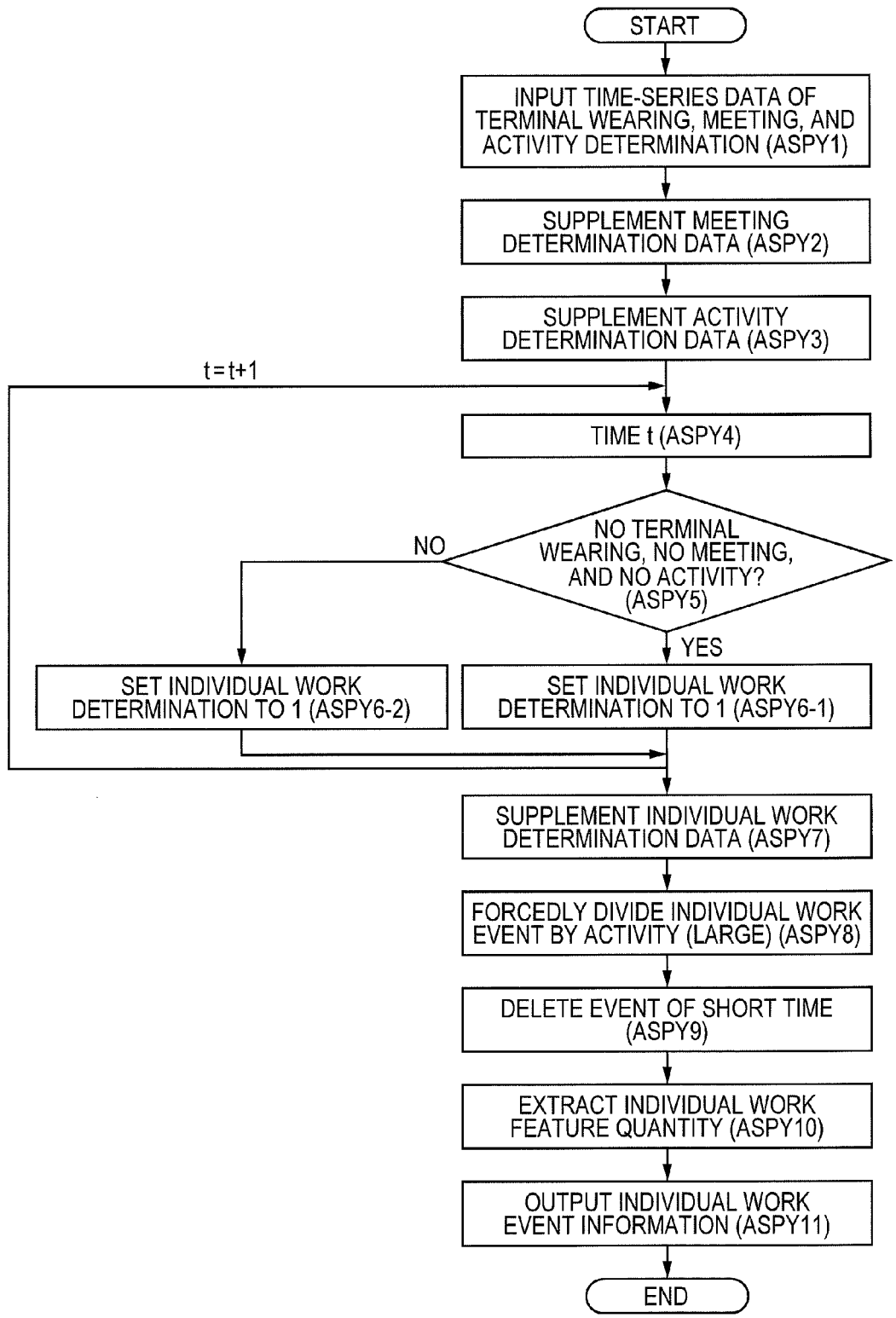
FIG. 23 is a flowchart of individual work event extraction processing.

<FIG. 23: Flowchart of Individual Work Event Extraction Processing (ASPY)>

FIG. 23 is a flowchart illustrating a processing procedure of the individual work event extraction processing (ASPY). FIG. 24 illustrates a specific example of this procedure. In this example, it is assumed that the individual work is mainly a desk work, and a case in which data is obtained when the person wears the terminal (TR), the person does not have face-to-face communication, and the motion of the body is small is determined as the individual work. For this determination, time-series data related to terminal wearing determination, meeting determination, and activity determination is used. Because the individual work event is to be extracted with a large time unit, the respective time-series data is supplemented in advance, and the determination is then conducted in order. If the supplement is unnecessary, any supplement process may be skipped.

First, the time-series data related to the terminal wearing determination, the meeting determination, and the activity determination are input (ASPY 1). In an example of FIG. 24, data on a one-minute basis is used.

The terminal wearing determination is data indicative of whether the user (US) wears the terminal (TR), or not. A case in which the terminal (TR) is set up in a charger, a case in which the terminal (TR) is placed on a desk, or a case in which the terminal (TR) is stored in a baggage is determined with the user of the acceleration data or the luminance data, and those cases are removed in the results (P1 in FIG. 24).

Meeting determination data is the determination results that a subject person meets at least one person. In particular, the meeting determination using the infrared rays is frequently discontinued due to the orientation of the body. Therefore, the meeting determination data is supplemented and regarded as a continuous meeting (ASPY 2). In an example of P2-2 in FIG. 24, a blank of 4 minutes or shorter (determination results are 0) is filled. This is expressed as "supplemented with supplement coefficient 4". Not only the determination by receiving the infrared rays from another terminal (TR), but also the results discriminating a television conference or a telephone conference may be also included in the meeting determination data.

The activity determination data represents a case in which the acceleration rhythm (frequency) is equal to or larger than a threshold value (th_per) as 1. Empirically, during a desk work, the motion of the body is small, and the acceleration rhythm acquired by the terminal (TR) becomes also a low value. For that reason, a case in which the activity determination is 0, that is, a case in which the acceleration rhythm is smaller than the threshold value, is set as a candidate of the individual work. When a time when the motion stops only in a short time between an interval of the activity is determined as the individual work, the short individual work event is extracted. Therefore, if necessary, the activity determination data supplement (ASPY 3) may be conducted before the individual work determination. In an example of P3-2 in FIG. 24, the supplement coefficient is supplemented as 1.

After finishing the above supplement, it is determined whether there is the individual work, or not, in order from a start to an end of the time (t) to be calculated (ASPY 5). In this example, a case in which the person wears the terminal, does not meet another person, and has no activity is not the individual work, is determined as the individual work with the use of the above supplemented time-series data (ASPY 6-1). The other case is determined as no individual work (ASPY 6-2). The results are P4-1 in the example of FIG. 24. Then, the individual work determination data is again supplemented (ASPY 7), to make the individual work event continuous. Finally, a case in which the motion is large over a threshold value (th_perL) which is a threshold value higher than the activity determination is regarded as activity (large), and only in this case, the individual work event is forcedly divided (ASPY 8).

Finally, the events of a short time where the duration time of the event is equal to or smaller than a threshold value (th_dp) are deleted (ASPY 9), the feature quantities (convergence (high), convergence (low), stagnation, maximum convergence duration time) of the respective remaining individual work events are extracted (ASPY 10), and the event information (start time, end time, member ID, respective feature quantities) is output to the individual work event table (ASPE)(ASPY 11), and the processing is finished.

An example of the feature quantity extraction of the individual work events is illustrated in FIG. 25. The feature quantities of the individual work represent the qualitative breakdown of the desk work. More specifically, attention is paid to the acceleration rhythm, and a case in which the motion is too small such as nap, meditation, or rest is regarded as "stagnation", and a time other than the meditation is regarded as "convergence". Further, a case in which a time during which the convergence continues is equal to or larger than a threshold value (th_perS) is classified into "convergence (high)", and a case in which the time during which the convergence continues is smaller than the threshold value (th_perS) is classified into "convergence (low)"

Figure 27:
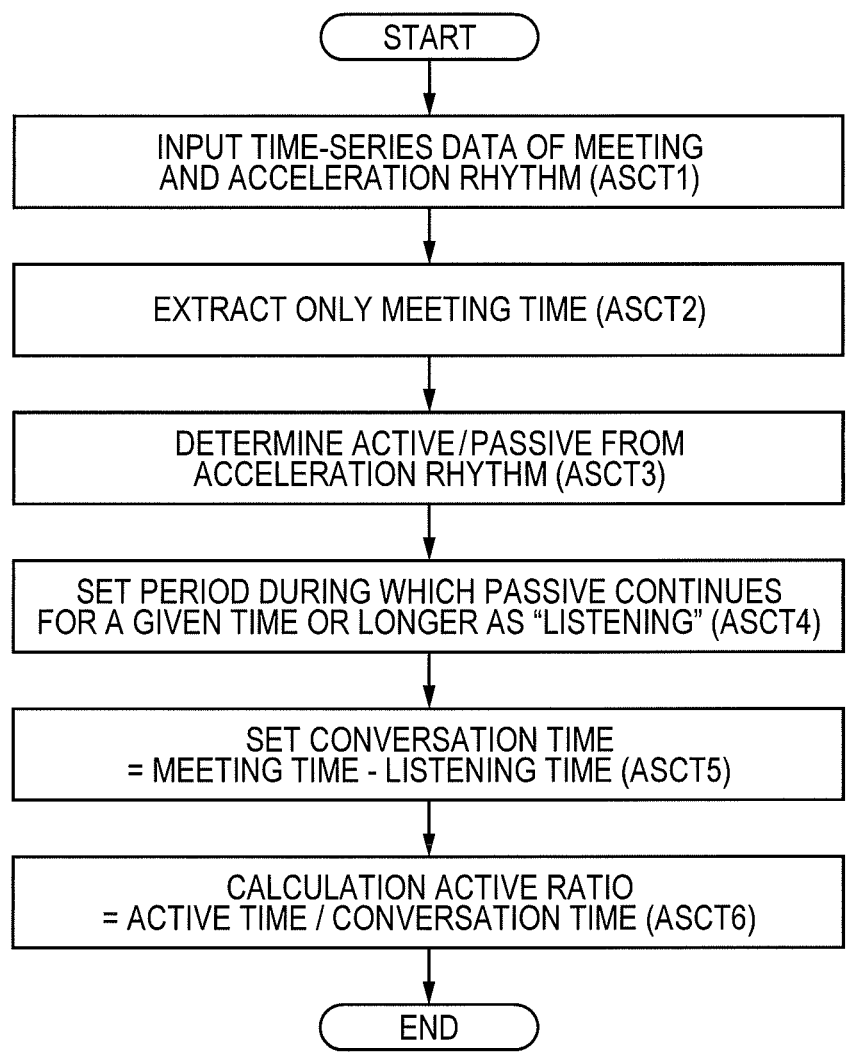
FIG. 27 is a flowchart illustrating a calculating process of an active ratio.

<FIG. 27: Flowchart of Active Ratio Calculation>

FIG. 27 is a flowchart of a calculation method of the active ratio which is the feature quantity of the meeting element event extraction processing (ASCT).

The positivity during conversation is expressed by the wiggle of the body such as gesture. Therefore, a case in which the acceleration rhythm of the terminal (TR) is high can be quantitatively evaluated as "active", that is, positive communication. Conversely, a case in which the acceleration rhythm is low is regarded as "passive", that is, negative communication. Since it is conceivable that a creative discussion is a situation in which the persons actively speak about their thoughts with each other, it is conceivably useful to indicate the quality of such a communication and continue to monitor the quality for the purpose of enhancing the creativity and productivity of the organization.

Figure 26:
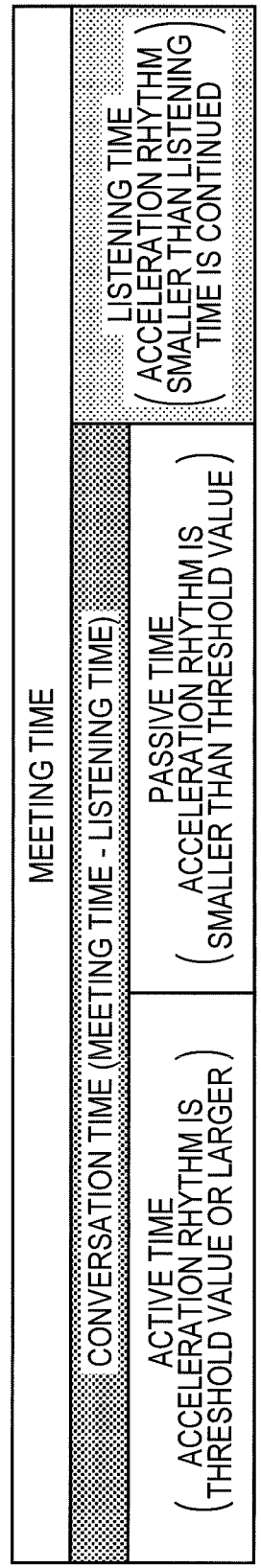
FIG. 26 is a diagram illustrating the classification of meeting communication.

As an index indicative of the quality of the communication, the ratio of the active time is obtained. In this case, the ratio can be obtained as {active ratio=active time/meeting time} with the meeting time as a denominator. However, this case suffers from a problem that the passive time is increased because the active ratio is not changed by the effort of the person, for example, the person listens to presentation of another person, resulting in the low active ratio. For that reason, the passive time continued for a long time is defined as "listening time", and "conversation time" obtained by subtracting the listening time from the meeting time is used as the denominator of the active ratio. Empirically, because the listening time depends on the property of the business, the active ratio calculated with the inclusion of the listening time hardly expresses the characteristics caused by the motion of the person. For that reason, as illustrated in a schematic diagram of FIG. 26, the active ratio in the conversation time is evaluated, to thereby quantify the positivity of conversation as a result of the motion of the person. Hence, the value is calculated as {active ratio=active time/conversation time}.

The calculation method of the active ratio illustrated in FIG. 27 can be used in the same method so that the calculation method not only calculates the active ratio for the meeting event time, but also calculates the active ratio for a given period such as one day or one month with respect to a specific person.

A calculating process of the active ratio will be described with reference to a flowchart of FIG. 27. First, the meeting data and the time-series data of the acceleration rhythm related to the person to be calculation are input from the meeting tapestry (SSDB_IRTP_1min) and the acceleration tapestry (SSDB_ACCTP_1min) (ASCT 1). A time during which the person meets at least one person is extracted (ASCT 2), and if the acceleration rhythm at the same time is equal to or larger than the threshold value (th_act), the time is determined as active. On the other hand, if the acceleration rhythm is smaller than the threshold value (th_act), the time is determined as passive (ASCT 3). The time during which the person meets another person in ASCT 2 is not only the time when the infrared rays are received from another terminal (TR). A time during which it is determined according to speech data that the user (US) who is an owner of the terminal speaks, and a time during which it is detected by the location beacon (PB) that the person is present in front of a videophone system or in a specific conference room, may be regarded as "time during which the person meets another person".

Then, a period where the passive time continues for a time of the threshold value (th_lst) or longer, is extracted, and the extracted period is set as "listening time" (ASCT 4). A time obtained by subtracting a total listening time from a total meeting time during a period (period of the meeting event, one day, or one month) to be quantified is set as "conversation time" (ASCT 5). Finally, a value obtained by dividing a total active time by a total conversation time in the subject period is calculated as an effective active ratio of that period (ASCT 6).

Figure 28:
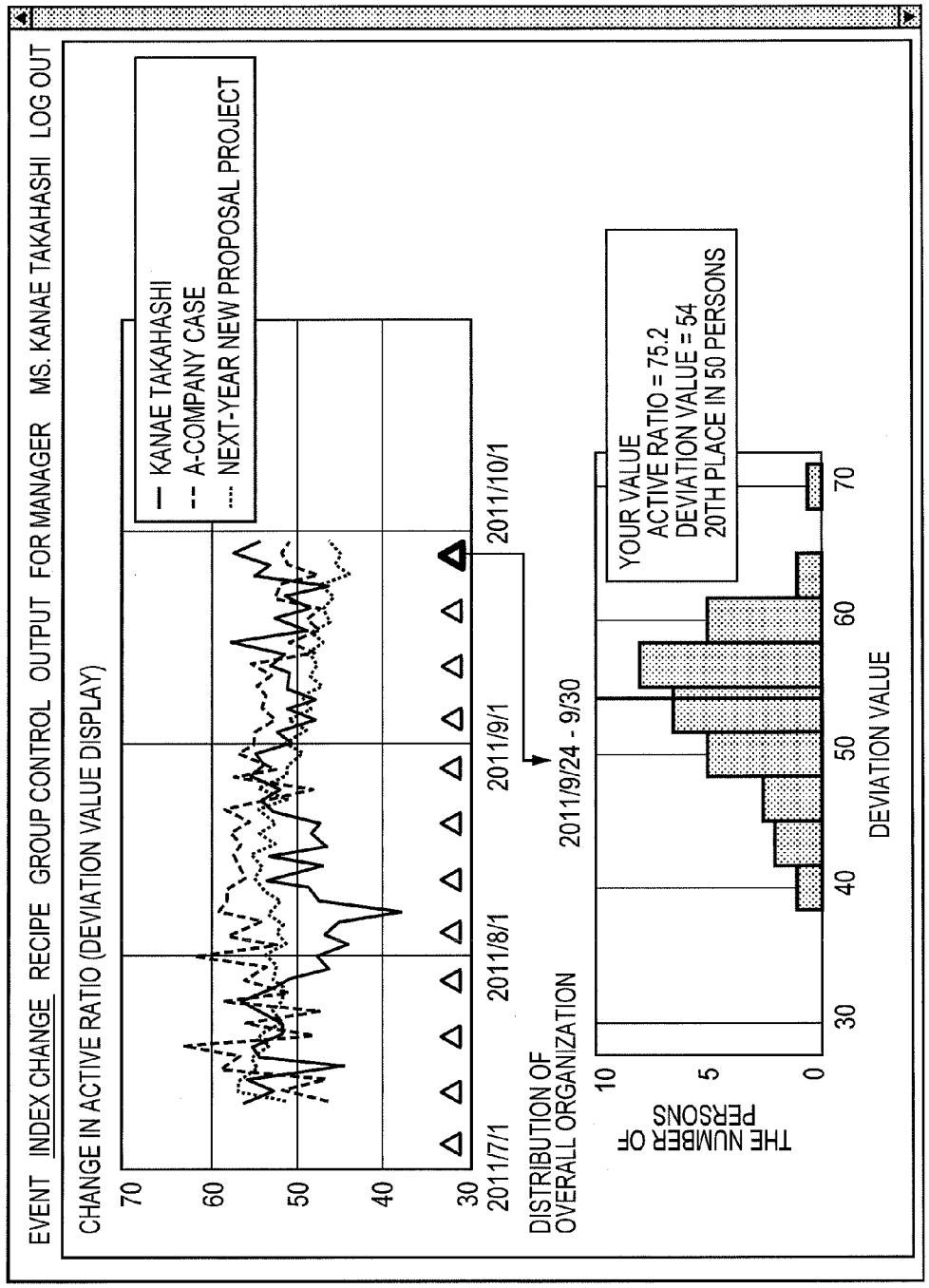
FIG. 28 is a diagram illustrating an example of a display screen using the active ratio.

FIG. 28 illustrates an example of the display screen using the active ratio calculated by the above technique. In order to grasp a time-series change in the active ratio of the individual or the group, the results of the individual, or the results obtained by averaging values of the events in the defined group can be represented by a line graph. The value is not the active ratio per se, but may be indicated by a deviation value with data of a plurality of organizations and a long period as a parameter. Also, a distribution of the active ratio during a specific period in the organization to which the person belongs is displayed by a histogram, and the active ratio of a subject person can be indicated in the histogram.

The embodiment of the present invention has been described above. However, the present invention is not limited to the above embodiments, but can be variously modified. Also, it would be understood by an ordinary skilled person that the above respective embodiments may be arbitrarily combined together.

What is claimed is:

1. An event data processing apparatus, comprising:
a memory that stores meeting information including a time, person information, and data indicating that persons meet each other therein;
a controller programmed to receive an input of the meeting information, and control recording of the meeting information in the memory; and
a processor programmed to calculate a number of meeting persons who meet each other according to the meeting information of the input received by the controller, calculate a first meeting person number difference which is a difference in the number of meeting persons between a first number of meeting persons at a first time and a second number of meeting persons at a second time and a second meeting person number difference which is a difference in the number of meeting persons between a third number of meeting persons at a third time and a fourth number of meeting persons at a fourth time, determine that a continuous communication is conducted between the first time and the second time and records persons included in the first number of meeting persons and the second number of meeting persons, the first time, and the second time in association with event identifiers for identifying events when the first meeting person number difference is equal to or smaller than a meeting person number threshold value which is a predetermined threshold value, and determine that a continuous communication is conducted between the first time and the fourth time and records persons included in the third number of meeting persons and the fourth number of meeting persons, the third time, and the fourth time in association with event identifiers for identifying events when the first meeting person number difference and the second meeting person number difference are equal to or smaller than the meeting person number threshold value;
wherein the controller outputs the recorded event identifiers;
wherein the third time is a predetermined time plus the first time;
wherein the fourth time is the predetermined time plus the second time; and
wherein the predetermined time is shorter than an interval between the first time and the second time.

2. The event data processing apparatus according to claim 1,
wherein the processor calculates meeting member information which is information related to members of the meeting persons according to the meeting information of the input received by the controller, calculates a member match rate which is the degree of match between first meeting member information at the first time and second meeting member information at the second time, determines that a continuous communication is conducted between the first time and the second time if the member match rate is equal to or larger than a member match rate threshold value which is a predetermined threshold value, and records the persons included in the first number of meeting persons and the second number of meeting persons, the first time, and the second time in association with the event identifiers for identifying the events in the memory.

3. The event data processing apparatus according to claim 1,
wherein the memory further stores motion information which is information related to the motions of bodies in association with the meeting information;
wherein the controller further receives an input of the motion information, and records the motion information in the memory; and
wherein the processor calculates meeting time zones which are time zones during which the continuous communication is conducted according to the meeting information, calculates motion values which are the degree of motion of the persons according to the motion information, determines a length of time during which the motion value is equal to or larger than a first motion threshold value which is a predetermined threshold value among the meeting time zones as an active time, and records the active time in association with the meeting information in the memory.

4. The event data processing apparatus according to claim 3,
wherein the motion information includes a frequency of acceleration or a zero cross value.

5. The event data processing apparatus according to claim 1, further comprising a screen,
wherein the controller displays the event identifiers on the screen.

6. The event data processing apparatus according to claim 1, further comprising a screen,
wherein the controller receives an input of the meeting person number threshold value.

7. The event data processing apparatus according to claim 1,
wherein the controller receives an input of a time interval between the first time and the second time.

8. The event data processing apparatus according to claim 2,
wherein the controller receives an input of the member match rate threshold value.

9. The event data processing apparatus according to claim 1,
wherein the meeting information includes communication information of infrared rays.

10. The event data processing apparatus according to claim 1,
wherein the controller receives inputs of comments on the events identified by the event identifiers, and stores the comments in association with the event identifiers in the memory module.

11. The event data processing apparatus according to claim 1,
wherein the person information includes group information to which the persons belong.

12. The event data processing apparatus according to claim 11, further comprising a screen,
wherein the controller controls display of the event identifiers on the screen on the basis of whether the event is associated with the person belonging to the group identified by the group information, or not.

13. The event data processing apparatus according to claim 3,
wherein the processor determines the active time for a plurality of different meeting time zones, and calculates time rates of change of the active time for the plurality of the different meeting time zones, and
wherein the controller outputs the time rates of change.

14. The event data processing apparatus according to claim 3,
wherein the meeting information is acquired by using an infrared communication and a location beacon.

15. The event data processing apparatus according to claim 2,
wherein the processor determines whether a first event and a second event are associated together, or not, on the basis of a time overlap ratio of the first event and the second event, and a member overlap ratio of meeting member information of the first event and the second event, and if the first event and the second event are associated together, the processor records the first event and the second event newly as a third event in the memory.

16. The event data processing apparatus according to claim 3,
wherein the processor determines a length of time during which a state where the motion value is equal to or smaller than a second motion threshold value which is a predetermined threshold value continues for a given time or longer as listening time, calculates an evaluation index which is a value obtained by dividing the active time by a conversation time which is a length of the meeting time zone minus the listening time, and records the listening time and the evaluation index in association with the meeting information in the memory, and
wherein the controller outputs the recorded evaluation index.

* * * * *